United States Patent
McCallen et al.

(10) Patent No.: US 10,168,245 B2
(45) Date of Patent: Jan. 1, 2019

(54) OPTICALLY-BASED INTERSTORY DRIFT METER SYSTEM FOR RAPID ASSESSMENT OF THE EARTHQUAKE RESPONSE OF BUILDING STRUCTURES

(71) Applicants: LAWRENCE LIVERMORE NATIONAL SECURITY, LLC, Livermore, CA (US); THE CSU, CHICO RESEARCH FOUNDATION, Chico, CA (US); Jason Coates, Chico, CA (US); Nick Repanich, Chico, CA (US); William Harvey Wattenburg, Chico, CA (US)

(72) Inventors: David B. McCallen, Livermore, CA (US); Jason Coates, Chico, CA (US); Nick Repanich, Chico, CA (US); William Harvey Wattenburg, Chico, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 15/509,757

(22) PCT Filed: Apr. 27, 2016

(86) PCT No.: PCT/US2016/029537
§ 371 (c)(1),
(2) Date: Mar. 8, 2017

(87) PCT Pub. No.: WO2017/011056
PCT Pub. Date: Jan. 19, 2017

(65) Prior Publication Data
US 2017/0307467 A1   Oct. 26, 2017

Related U.S. Application Data

(60) Provisional application No. 62/190,902, filed on Jul. 10, 2015.

(51) Int. Cl.
*G01M 5/00* (2006.01)
*G01M 7/02* (2006.01)
*G01B 11/16* (2006.01)

(52) U.S. Cl.
CPC .......... *G01M 5/0041* (2013.01); *G01B 11/16* (2013.01); *G01M 7/02* (2013.01); *G01M 7/025* (2013.01); *G01M 5/0025* (2013.01)

(58) Field of Classification Search
CPC ... G01B 11/16; G01M 5/0025; G01M 5/0041; G01M 7/02

(Continued)

(56) References Cited

U.S. PATENT DOCUMENTS 7,575,101 B2   8/2009  Copsey
8,830,477 B2 *  9/2014  Schreiber ............ G01M 5/0091
                                                356/460

(Continued)

FOREIGN PATENT DOCUMENTS

| CN | 101014528 A  | 8/2007  |
| KR | 100267030 B1 | 1/2001  |
| KR | 200437152 Y1 | 11/2007 |

OTHER PUBLICATIONS

International Search Report and Written Opinion of the International Searching Authority for PCT/US2016/029537, dated Aug. 5, 2016; ISA/KR.

*Primary Examiner* — Tri T Ton
(74) *Attorney, Agent, or Firm* — Harness, Dickey & Pierce, PLC

(57) ABSTRACT

A sensor system provides measurement of building interstory drift based on a laser beam impinging on a discrete diode sensor array. The diode sensor array determines the location at which a projected laser bean strikes the array, which provides a direct measurement of interstory drift. The diode sensor array is a two dimensional array of discrete (Continued)

diodes that allow the location of an impinging laser beam to be very accurately tracked as the beam moves back-and-forth across the diode array. Local rotations of the laser source that result from rotations of structural members (e.g. floor beam rotation) are appropriately corrected for. This allows accurate, dynamic measurements of the interstory drift between two floor levels of a shaking building.

18 Claims, 19 Drawing Sheets

(58) Field of Classification Search
USPC .................................................. 356/614–640
See application file for complete search history.

(56) References Cited

U.S. PATENT DOCUMENTS

2004/0174542 A1* 9/2004 Handman .............. G01B 11/16
356/622
2007/0251765 A1 11/2007 Copsey \* cited by examiner

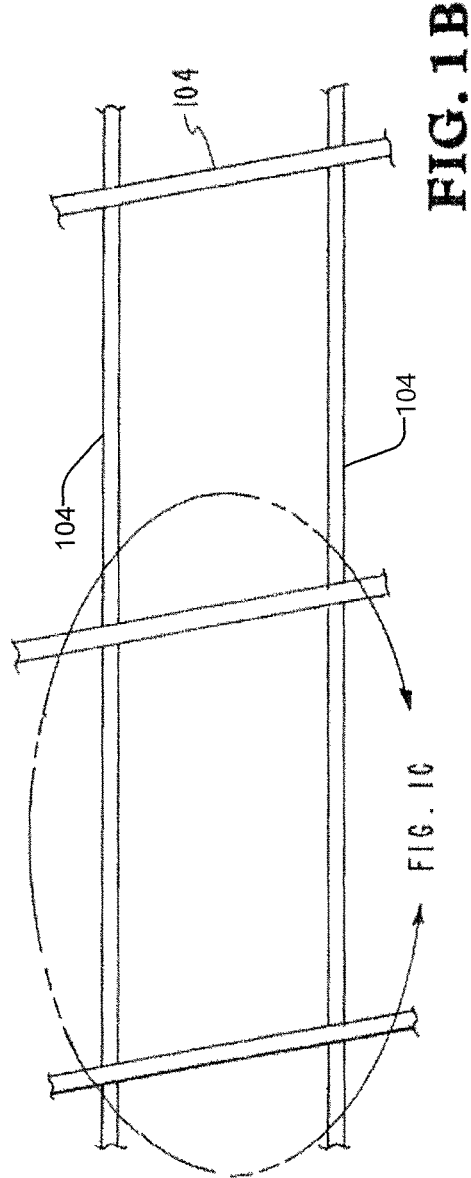
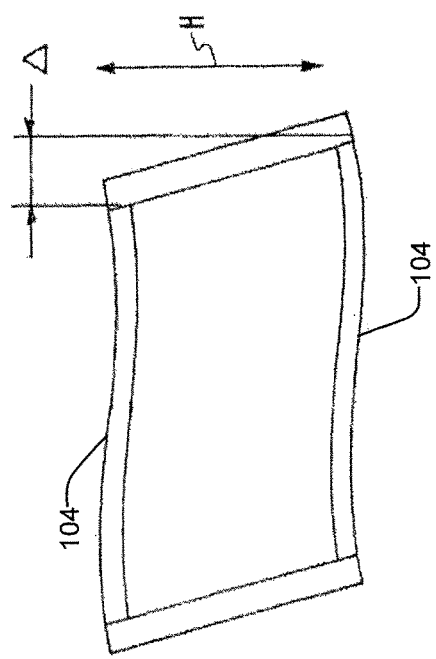
FIG. 1B
FIG. 1C

Sample circuit of diode array based sensor

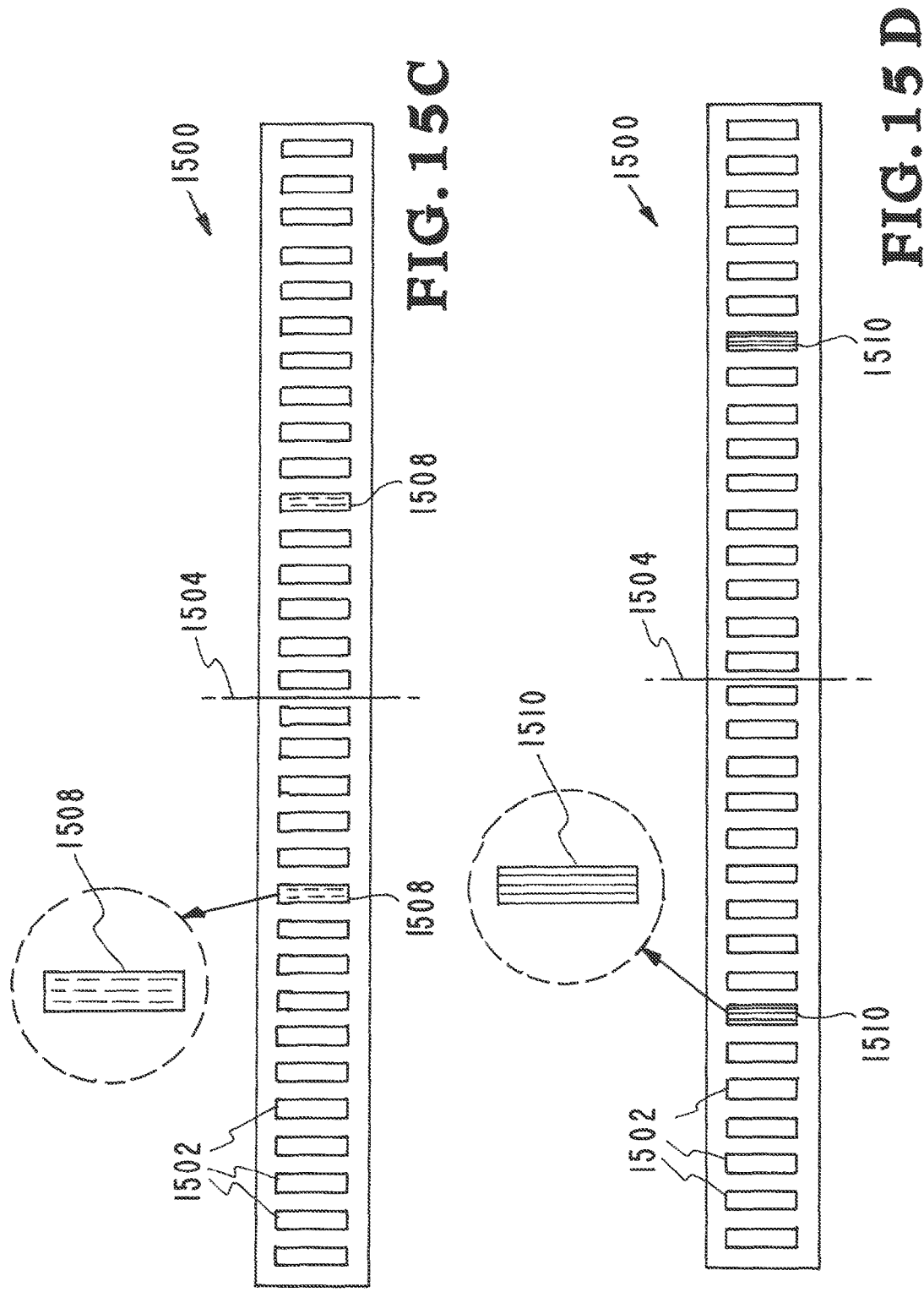

OPTICALLY-BASED INTERSTORY DRIFT METER SYSTEM FOR RAPID ASSESSMENT OF THE EARTHQUAKE RESPONSE OF BUILDING STRUCTURES

CROSS-REFERENCE TO RELATED APPLICATIONS

This application is a U.S. National Phase Application under 35 U.S.C. 371 of International Application No. PCT/US2016/029537 filed on Apr. 27, 2016 and published in English as WO 2017/011056A1 on Jan. 19, 2017. This application claims priority to and benefit under 35 U.S.C. § 119(e) of U.S. Provisional Patent application No. 62/190,902 filed Jul. 10, 2015 entitled "an optically-based interstory drift meter system for rapid assessment of the earthquake response of building structures", the content of both of which are hereby incorporated by reference in theft entirety for all purposes.

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to assessment of earthquake response of building structures and more particularly to an optically-based interstory drift meter system for rapid assessment of the earthquake response of building structures.

State of Technology

This section provides background information related to the present disclosure which is not necessarily prior art.

Immediately after the occurrence of a major earthquake, there is a strong motivation for developing a rapid assessment of the degree to which a building has been shaken, and for determining if significant damage has occurred to the building. This is particularly important given that external visual observations of the building cannot reliably indicate whether there has been significant damage to the building's structural system over the duration of the earthquake shaking. In addition to uncertainties related to the risk to human safety, an inability to rapidly assess building integrity can have a major impact on timely re-occupancy and resumption of functional operations.

In an urban environment, where literally thousands of buildings can be shaken in a major earthquake, there is an immediate and enormous demand for understanding whether a large inventory of buildings present occupant safety risks. Typical procedures for engineering inspections are time consuming and constrained by the lack of availability of a sufficient number of qualified structural engineers after a major earthquake—a lesson learned in California's Loma Prieta earthquake in 1989. A system that can immediately and efficiently yield data on the integrity of a building would be particularly useful for informing appropriate post-earthquake actions in a densely built urban environment.

Interstory Drift as a Fundamental Response Measurement

A fundamental measurement of building response during an earthquake is the building interstory drift, which is computed as the relative displacement between two adjacent floors of a building. FIGS. 1A, 1B, and 1C provide an illustration of "Interstory drift." FIG. 1A illustrates "Interstory drift" which is designated generally by the reference numeral 100. A multistory building 102 located on the earth 106 experiences movement in an earthquake causing the building to be displaced from the vertical as illustrated in FIG. 1A. FIG. 1B illustrates two adjacent floors 104 of the building 102. FIG. 1C illustrates Interstory Drift Ratio (IDR). Interstory Drift Ratio "Γ" is defined as the relative translational displacement "Δ" between two consecutive floors divided by the story height "H" (Γ=Δ/H).

Interstory drift is a measure of the deformation and stress demand on a building system and represents a fundamental design variable in many seismic design codes. Concept definitions of building responses for a typical steel frame building where interstory drift ratio is correlated with the level of building damage which for example could include:

Yield Point=amplitude of the interstory drift ratio at which structural member inelastic action initiates;

Plastic Hinge Formation=amplitude of the interstory drift ratio at which structural members form a full plastic hinge (material yielding throughout the member cross section); and Ultimate Moment Capacity=amplitude of interstory drift ratio at which the ultimate load carry capacity of the members is achieved.

Measurement and read-out of interstory drift values after an earthquake allows comparison to design code or building drift indices, established by cognizant structural engineers, which are representative of different damage levels for the building in question.

Indirect Measurement of Interstory Drift with Strong Motion Accelerometers

Traditional building earthquake instrumentation has been based on strong motion accelerometers that measure the absolute acceleration time history at the physical location of the accelerometer. Existing earthquake instrumentation systems typically utilize a relatively sparse array of accelerometers distributed throughout the height of the building. Such a system provides some insight on the degree to which the building was shaken, but it does not provide direct, detailed information on the deformations (e.g. interstory drift) and associated stresses in the building. Because building displacements and associated deformations are of primary interest, the accelerometer data must be post-processed through a double numerical integration to ultimately estimate interstory drifts. Such processing is very challenging and has associated errors. In addition, accelerometers are dynamic systems with frequency bandwidth limitations and cannot accurately reproduce permanent displacements in the structure associated with inelastic behavior of the building system. The overall challenges and problems associated with strong motion accelerometers are documented in the journal paper "Critical Assessment of Interstory Drift Measurements," by D. A. Skolnik and J. W. Wallace, American Society of Civil Engineers, Journal of Structural Engineering, 2010.136:1574-1584.

Devices/Methods for Direct Measurement of Interstory Drift

A number of researchers have proposed measurement schemes and associated devices for direct measurement of building interstory drift. These have ranged from physical contacting devices such as a taught wire with a linear variable displacement transformer (LVDT) that measures the sway deformation of a frame bay, to optical based techniques that measure lateral displacement of the building.

One optical approach that has been explored is to utilize a laser whose point of incidence can trace the lateral displacement, and corresponding interstory drift of the building. However, there has not been a viable, existing sensor that would enable the full system design based on such a measurement technique. Existing commercially produced position sensitive detectors or devices (PSDs), which are photoelectric based sensors that can be used to accurately measure the location of an impinging laser beam, are very costly and too limited in physical size. In typical buildings, the amplitude of interstory drifts that must be measured during a large earthquake (potentially multiple inches of interstory drift) are simply too large relative to the size of commercially available PSDs.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The invention described herein is directed to an optically-based interstory drift meter system for directly measuring earthquake-induced interstory drift of a building structure, and a broad frequency response PSD of said system comprising a staggered array of discrete photodiode sensors which are staggered along a predetermined direction of measurement. This sensor unit is defined as a Position Sensitive Detector Array (PSDA). Direct interstory drift measurements are conceptually simple and processing of the data is straightforward relative to accelerometer based systems, and can be compared directly with known interstory drift damage indices that quantify damage levels for the building being monitored. As such, direct interstory drift measurements performed by the present invention enable rapid assessment of and insight into potential building damage and structural condition immediately after an earthquake, without the need for extensive post-processing of measured data. And unlike accelerometer-based systems, such an optically-based interstory drift meter and building monitoring system can be particularly effective in measuring permanent interstory drifts that result from inelastic action in the building during earthquake shaking.

In one embodiment, the system of the present invention provides a modular system comprising a low energy, e.g. 20 mW, diffracted laser beam source and the broad frequency response PSDA unit, which may be installed between any two accessible points (e.g. between two floors with clear line of sight) of a building as shown in FIGS. 2, 3, and 4. The diffracted laser beam source is adapted to produce a diffracted laser beam which, when directed upon a surface of the PSDA unit, produces a linear beam trace, i.e. an illuminated line of incidence, that is oriented transverse to the predetermined direction of measurement, and whose incidence position on the PSDA unit indicates the instantaneous interstory drift (or no drift) at any instant during an earthquake. And the broad frequency response PSDA unit of the present invention has an application-specific design adapted to accurately measure interstory drift of buildings over a broad frequency range, i.e. it is adapted to measure interstory drift at the frequencies and displacement amplitudes required for building monitoring applications. In particular, the PSDA unit comprises a staggered array of discrete photodiode sensors which are arranged in a predetermined staggered pattern along the predetermined direction of measurement. For example, FIG. 5 shows three staggered diodes per row, with two diodes overlapping along the length of the PSDA unit in the direction of measurement. This predetermined staggered arrangement enables the array of photodiodes to detect the linear beam trace at various distances from an initial undisplaced reference position of the beam trace, from which lateral displacement may be determined by the distance associated with the triggered diode or diodes.

When installed in this manner between two accessible points of a building structure, the system is adapted to directly and accurately measure transient and inelastic interstory drifts experienced by the building during an earthquake, by measuring the lateral displacement of the linear beam trace in the direction of measurement and relative to the staggered array of discrete diode sensors of the PSDA unit, to provide immediate post-event readout/display of such measurements with a resolution and dynamic response suitable for measuring building response. The system of the present invention is capable of accurately measuring transient, dynamic motions over a broad frequency range associated with building vibrational response and which may be experienced over the duration of an earthquake, which is essential for effective application to a broad spectrum of buildings where the frequency response ranges from higher frequencies (shorter buildings) to lower frequencies (taller buildings). In particular, the invention provides relative floor displacement measurements for all frequencies of movement in the expected frequency range from 0 to 10 Hz (or higher if the particular dynamics of a structure demands) without requiring the integration of accelerometer signals that cannot provide accurate displacement measurements for low frequency movements. Particularly designed and tailored to the application of interstory drift measurement of building structures, the PSDA unit of the present invention has been demonstrated through extensive laboratory testing to provide the appropriate frequency bandwidth and amplitude levels that enable a comprehensive building earthquake monitoring system design.

Furthermore, because the PSDA unit may be fabricated using conventional semiconductor components and fabrication methods, it can be very cost effective and overcome the significant physical size limitations and fabrication costs of existing commercial position sensitive photoelectric sensors. Consequently, multiple systems of the present invention may be deployed across multiple floors and building a drift measurement can be performed at each, or many, floors of the building, eliminating the uncertainties associated with sparse data of existing accelerometer based systems.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

FIGS. 1A, 1B, and 1C illustrate "Interstory Drift."

FIGS. 15A, 15B, 15C, and 15D illustrate digital bars for and immediate visual read-out of peak interstory drifts at each floor level.

DETAILED DESCRIPTION OF SPECIFIC EMBODIMENTS

Figure 1A:
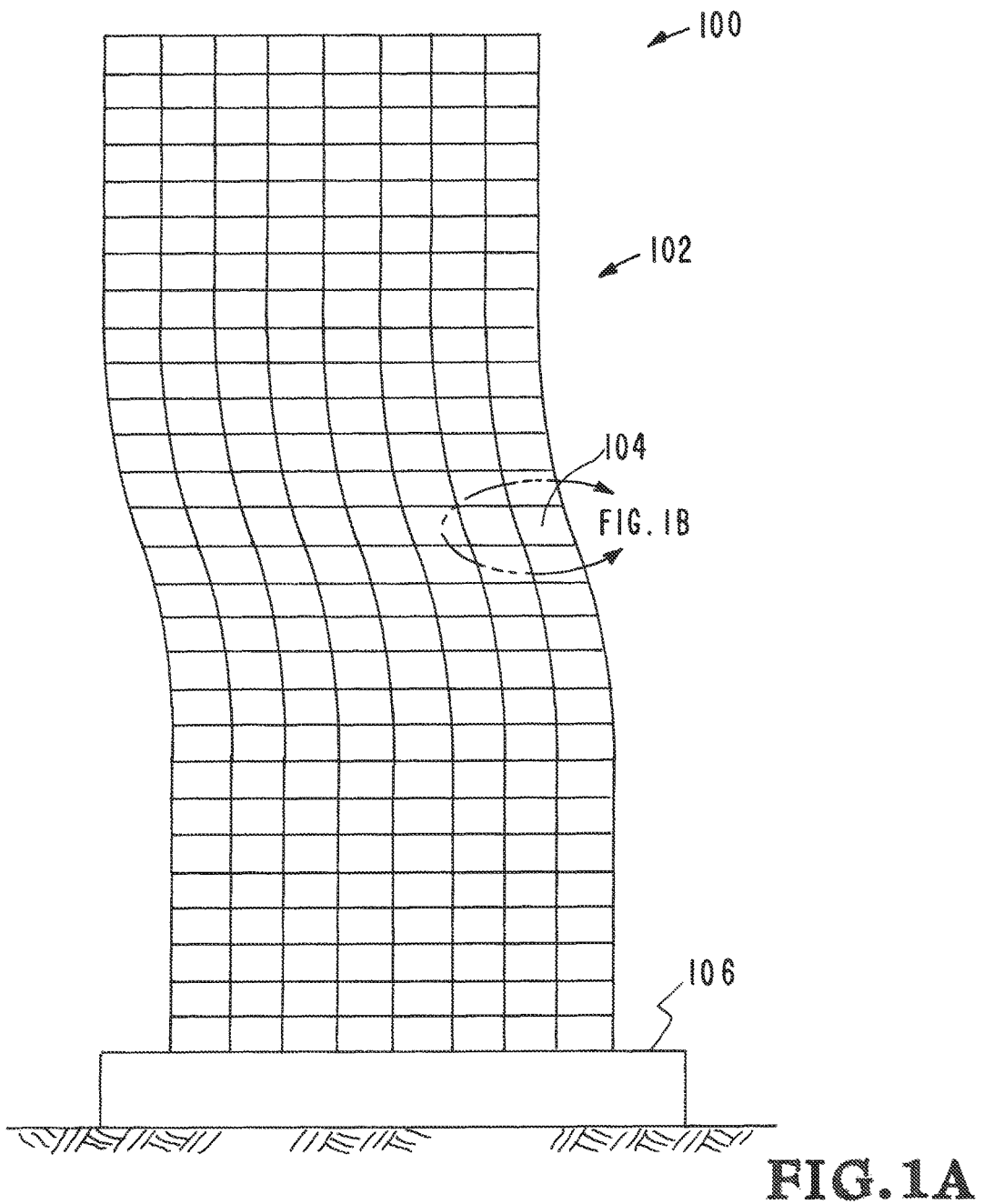

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Optically-Based Interstory Drift Meter System Example Embodiments

Figure 2:
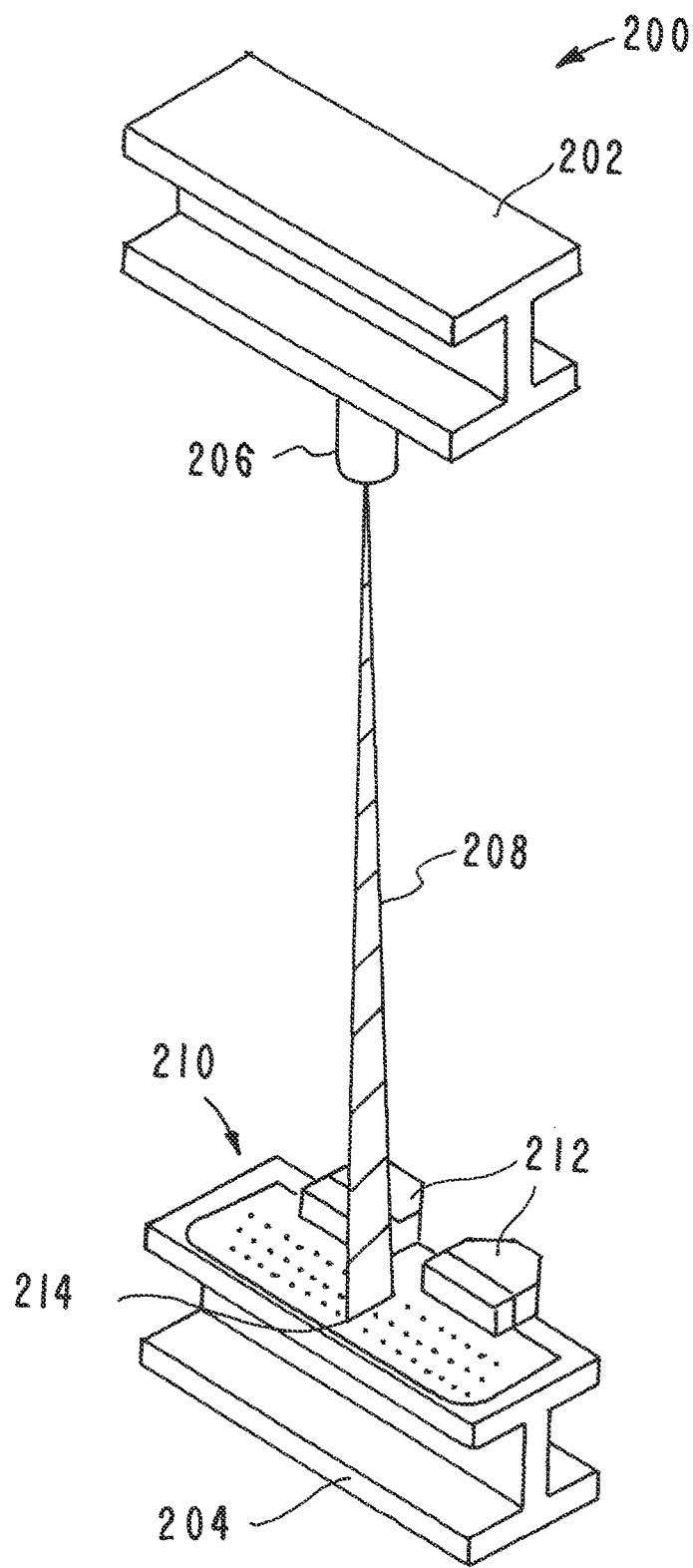
FIGS. 2, 3, and 4 illustrate one embodiment of a system of the present invention.
Figure 3:
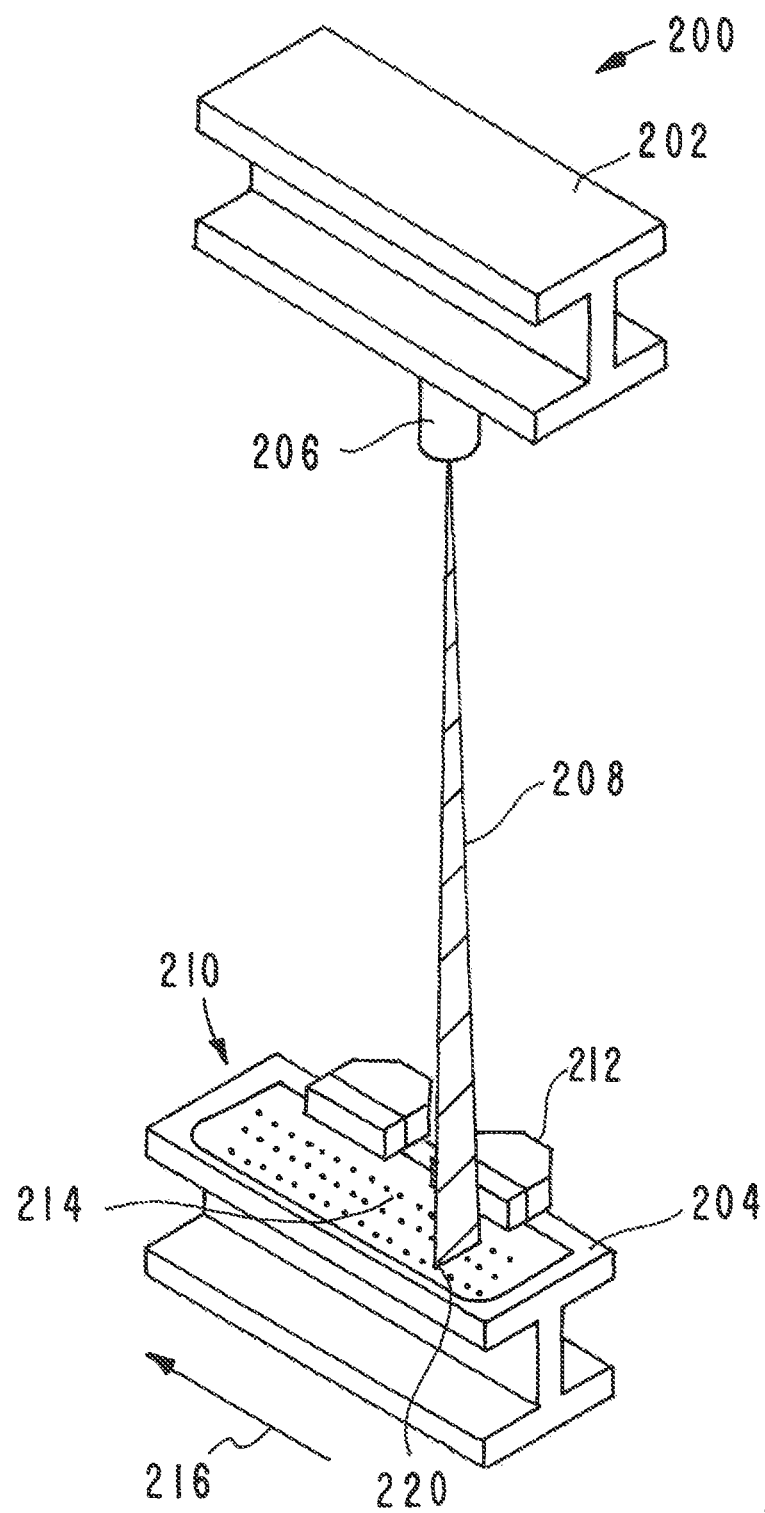
Figure 4:
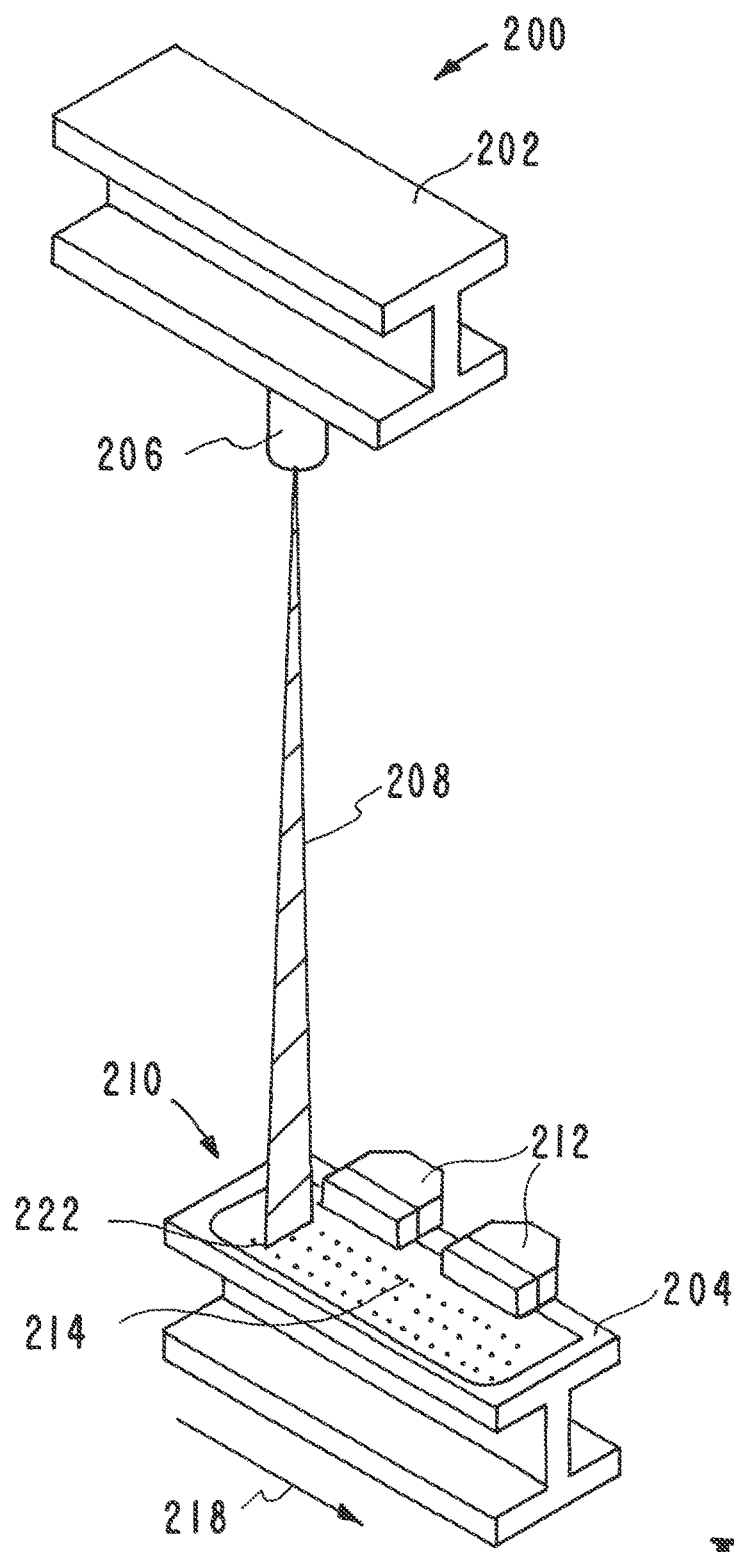

Turning again to the drawings, FIGS. 2, 3, and 4 illustrate an example of the basic configuration of the optically-based system for measuring interstory drift of the present invention. FIGS. 2, 3, and 4 illustrate the inventor's Inter-Story Drift Meter System (ISDMS) in its most basic form. The ISDMS is designated generally by the reference numeral 200. The ISDMS 200 includes the following components:

Structural (floor) beam—202,
Structural (floor) beam—204,
Laser beam source—206,
Diffracted laser beam—208,
Position sensitive detector array (PSDA)—210,
Electrical connectors—212,
Neutral position on the PSDA—214,
Relative motion movement arrow (FIG. 3)—216,
Relative motion movement arrow (FIG. 4)—218,
Shifted position (Drift) (FIG. 3)—220, and
Shifted position (Drift) (FIG. 4)—222.

FIGS. 2, 3, and 4 show the inventor's ISDMS 200 with the laser beam 208 directed onto the position sensitive detector array 204 for detecting the range of movement of the building caused by an earthquake. In FIG. 2 the laser beam 208 is in the neutral position 214 on the detector array 210. In FIG. 3 the laser beam 208 is in a shifted position 220 on the detector array 210 indicating the range of movement of the building in one direction. In FIG. 4 the laser beam 208 is in a shifted position 222 on the detector array 210 indicating the range of movement of the building in the opposite direction.

Referring again to FIG. 2, the ISDMS 200 in its basic form is mounted between adjacent floor beams. The upper floor beam is structural floor beam 202 which we will call the $22^{nd}$ floor in a multi-story structure. An immediately adjacent structural floor beam 204 that we will call the $21^{st}$ floor is the lower floor beam. The upper beam 202 has a laser source 206 mounted to the underside of the upper beam 202. The lower beam 204 has the position sensitive detector array (PSDA) 210 mounted on the top side of the lower beam 204. The laser source 206 initially projects a diffracted laser beam 208 onto the mid portion of the PSDA 210, which is labeled as the neutral position 214. The PSDA 210 has electrical connectors that connect the PSDA to a computer system (not shown) that will collect, analyze, store and display the data produced by the PSDA 210.

FIG. 3 includes all the same components as FIG. 2 and shows that the diffracted laser beam 208 has moved some distance on the PSDA 210 as a result of earthquake induced interstory drift. The movement reflects movement of the beam 204 indicated by the arrow 216. The diffracted laser beam 208 has shifted from the neutral position 214 on PSDA 210 to new a new position 220 on the PSDA 210. The distance between the neutral position 214 and the new position 220 of the diffracted laser beam 208 on the PSDA 210 will produce data that can be used to calculate the inter-story drift.

FIG. 4 includes all the same components as FIG. 2 and shows that the diffracted laser beam 208 has again moved some distance on the PSDA 210 (In the opposite direction of the movement shown in FIG. 2). The movement reflects movement of the beam 204 indicated by the arrow 218. The diffracted laser beam 208 has shifted from the neutral position 214 on PSDA 210 to new a new position 222 on the PSDA 210. The distance between the neutral position 214 and the new position 222 of the diffracted laser beam 208 on the PSDA 210 will produce data that can be used to calculate the inter-story drift.

Figure 5:
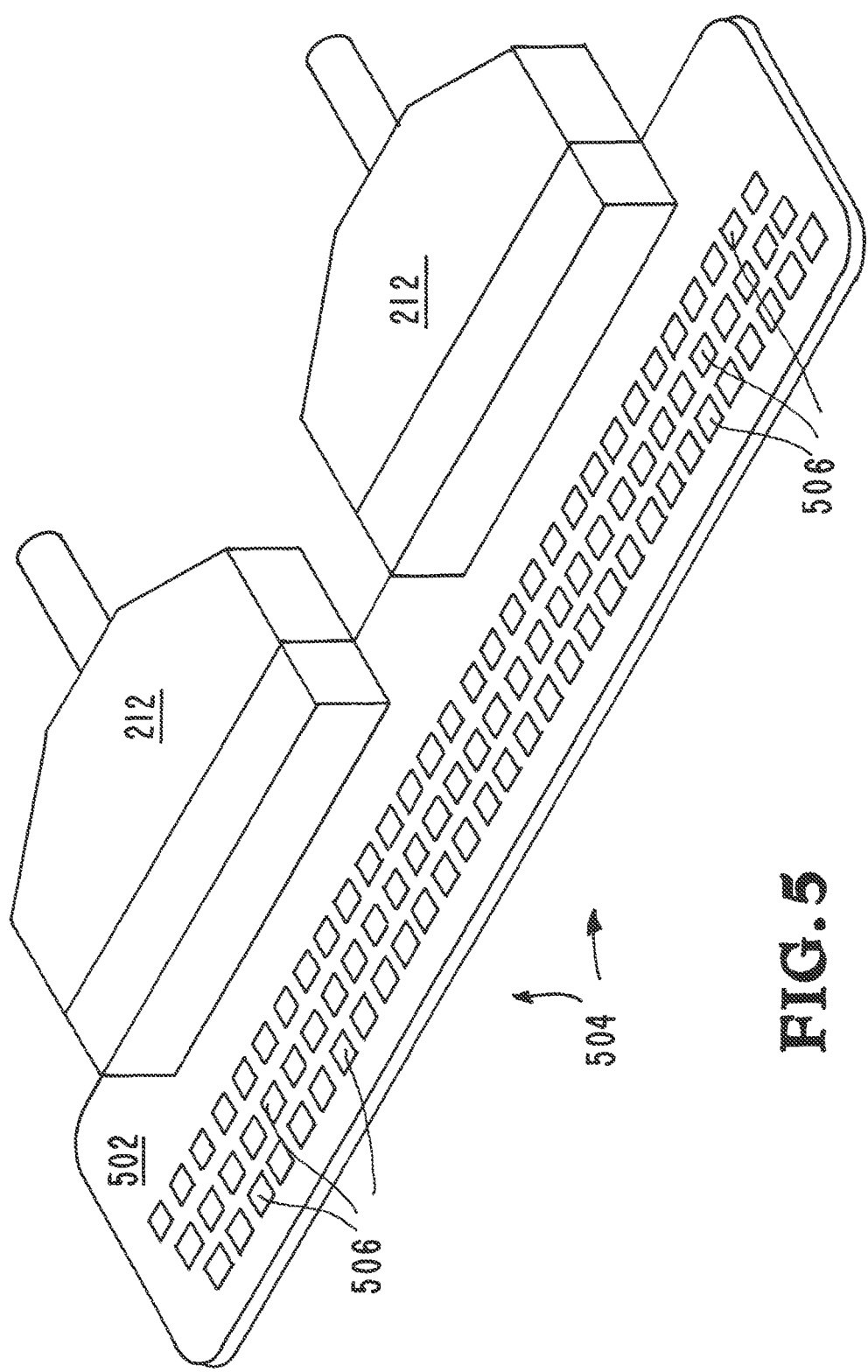
FIG. 5 is an enlarged and more detailed view of the sensor array portion of the system illustrated in FIGS. 2, 3, and 4.

Referring now to FIG. 5, an enlarged and more detailed view of the PSDA 210 is provided. The following is a list of the components of the PSDA 210:

Printed circuit board—502,
Sensor array—504,
Individual diode sensors—506, and
Electrical connectors—212.

FIG. 5 is a more detailed view of position sensitive detector array (PSDA). It includes an array 504 of individual sensors 506. The array 504 consists of three rows of sensors 506 arranged in a staggered configuration. The staggered configuration will be explained and better illustrated in FIG. 6. The PSDA also has electrical connectors 212 with cables that connect to a field programmable gate array and ultimately to a computer system for data logging.

Figure 6:
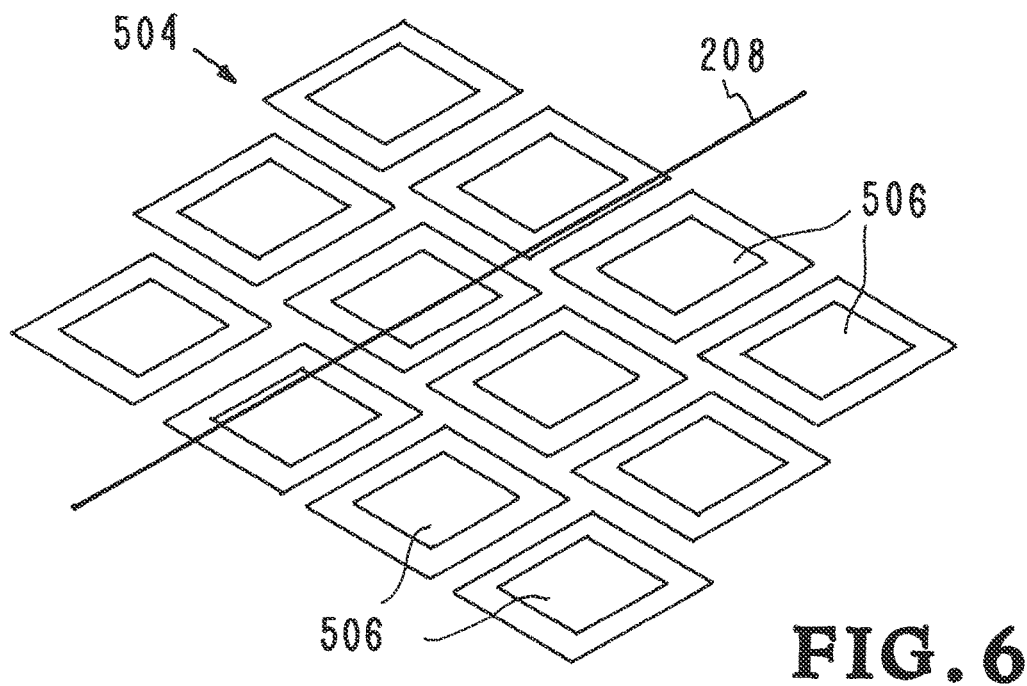
FIG. 6 is an enlarged and more detailed view of a portion of the sensor array illustrated in FIG. 5.

Referring now to FIG. 6, an enlarged partial view of the sensor array 504 of FIG. 5 is provided. Here we see the individual sensors 506 in a carefully designed, staggered configuration. The staggered configuration ensures that the diffracted laser beam 208 line will always cross a sensor 506 even though the line 208 may intersect the space between two sensors in one of the rows.

Figure 7:
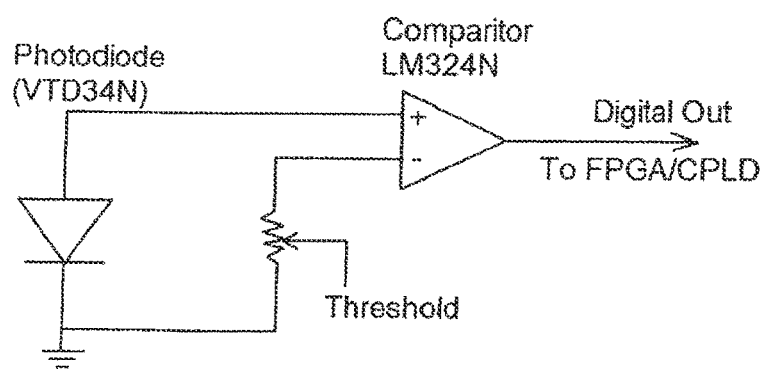
FIG. 7 illustrates a sample circuit of a diode array based sensor.

Referring now to FIG. 7, a sample circuit of a photodiode based sensor is shown.

The structural details of one embodiment of the inventor's Inter-Story Drift Meter System 200 having been identified and described, the operation of the system 200 will now be considered. In particular, a diffracted laser beam source and a PSDA comprising a staggered sensor array are each positioned and arranged at two different levels of a building, such as on two adjacent floor levels, so that a diffracted laser beam produced by the diffracted laser beam source is projected onto the position sensitive detector as a linear beam trace (shown as a linear trace) that is oriented transverse to a direction of measurement (see for example, FIG. 2 showing the linear trace of the diffracted beam) which in the example of FIG. 2 would be parallel to a longitudinal axis of the structural I-beam. The diffracted laser beam may be produced for example by directing a laser beam through an optical diffraction element to create a linear beam trace at the location of the PSDA. Creation of a diffraction beam trace, i.e. a line of incidence, as opposed to a point incidence of a virgin laser beam, is required to ensure that interstory drift in the plane of the building frame can be accurately measured when there is a superposition of orthogonal out-of-plane building displacements during three-dimensional earthquake induced shaking. The line trace is also key to the utilization of a staggered-array of discrete diodes in the PSDA sensor because it allows the diffracted beam to span across multiple staggered diodes. It is noted that for some structures, depending on the structural configuration and relative stiffnesses of the constituent structural members, there in general may be a need to apply a correction to account for any local beam rotation at the mounting location of the laser, but the fundamental concept of optical-based interstory drift measurement is relatively simple.

FIGS. 5, 6, and 7 illustrate an example embodiment of the broad frequency response PSDA of the present invention comprising a staggered two-dimensional array of discrete photodiode sensors which can individually sense incident laser light. In particular, the array of photodiodes are shown formed on a substrate with electronic metal traces connecting the photodiodes to input/output (I/O) ports for off-board processing of data and display. It is appreciated, however, that a processor and other functional components for memory, data storage, display, etc. may in the alternative be provided on-board the PSDA as an integrated unit. Furthermore, and in the alternative, such functional components may also be provided as additional components of the system suitably connected to the PSDA unit, or the PSDA unit and the laser beam source. Additionally, while substrate is shown upon which the array of diodes is formed and arranged, it is appreciated that other non-substrate based structural constructs or support frames may be utilized to arrange the discrete photodiodes in a staggered manner relative to each other.

In any case, the staggered array allows enhanced discrimination of the precise location of the incident laser beam, with a resulting higher precision measurement of interstory drift. As shown in FIG. 6, the staggered photodiodes 506 may be arranged to partially overlap in a transverse direction to the direction of measurement so that the incidence line of the linear laser beam trace 208 strikes multiple photodiodes at any given instant (except perhaps the first and last photodiodes at opposite ends of the array in the direction of measurement), but also arranged so that the leading and trailing edges (in the measurement direction) to not overlap photodiode active areas of other photodiodes. By rapid interrogation of the entire array of diodes 506 at every instant of time, the location of the laser line beam trace 208 can be determined and tracked during earthquake-induced motion of the building. This provides a direct measurement of the instantaneous interstory drift throughout the history of the earthquake. As discussed in the Summary, the array of photodiodes 506 is arranged in a predetermined staggered pattern along the predetermined direction of measurement. This staggered arrangement enables the array of photodiodes 506 to detect the linear laser beam trace 208 at various distances from an initial undisplaced reference position of the beam trace, from which lateral displacement may be determined by the distance associated with the triggered diode or diodes. The predetermined staggered pattern of the photodiodes 506, in terms of number of rows of diodes, number of diodes per row, diode spacing, and the degree of offset and overlap between staggered diodes in a row and between rows, provide key design variables and options for the sensor design. The degree of offset and overlap between staggered photodiodes 506 dictates the spatial fidelity of the sensor array 504 (i.e. the smallest increment in interstory drift displacement that the sensor array can detect) and provides the engineer with significant and desirable flexibility in the sensor array design.

An individual photodiode 506 output is an analog voltage in proportion to the amount of incident laser light impinging on the photodiode 506. For this application, the photodiode 506 is essentially used as an "on" (incident laser hitting the diode)-"off" (no incident laser light hitting the diode) detector. The sensor design employs a simple op-amp comparator circuit to indicate which photodiodes 506 are sensing incident light at any instant of time as illustrated in FIG. 7). A Field-Programmable Gate Array (FPGA) or Complex Logic Device (CPLD), or other data processing hardware or software may be used to latch the output value of the circuit for all the photodiodes 506 simultaneously to capture the incident laser position. The values are captured at a high enough sampling rate to ensure that the sensor array 504 captures the dynamic motion of the building during earthquake shaking. The specific sensor array design shown in FIGS. 2 through 7, which has been successfully demonstrated through experimental testing, utilizes a staggered array of 92 diodes with a sampling rate of 384 times a second.

Figure 8A:
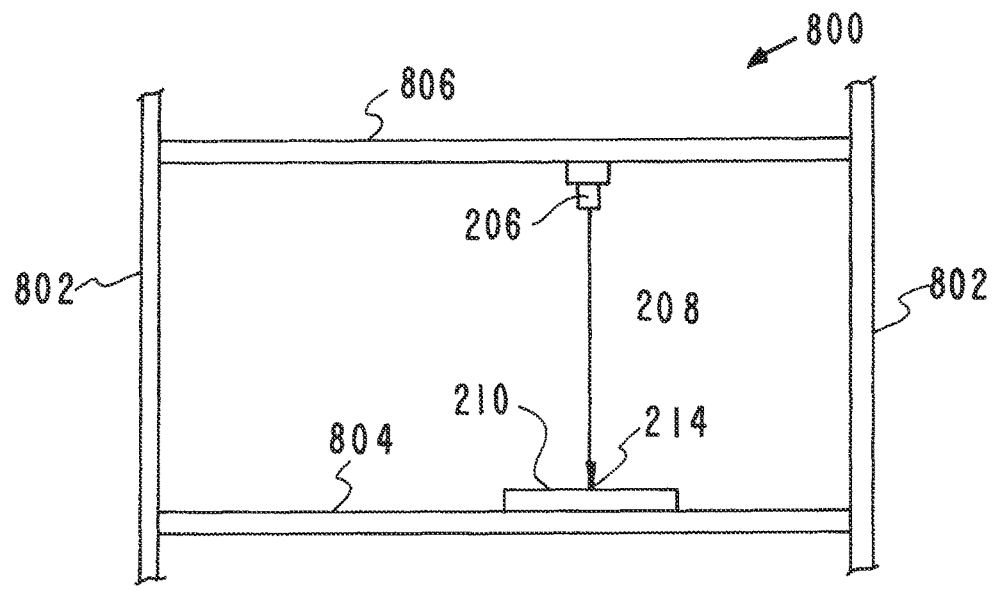
FIGS. 8A and 8B further illustrate the system of the present invention.
Figure 8B:
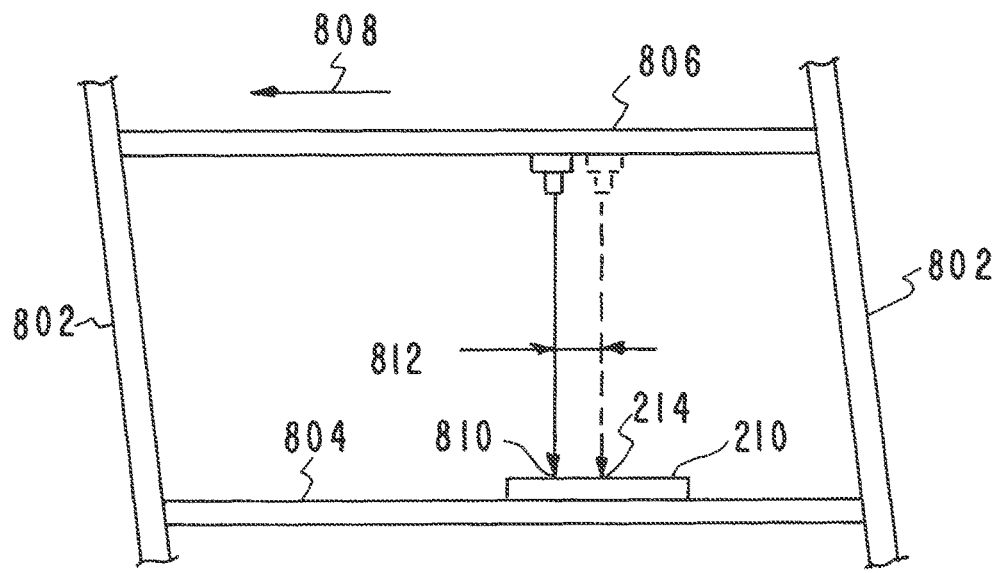

In operation, the diffracted laser beam trace 208 is directed across an individual building story from the overhead ceiling towards a PSDA 210 on the floor below as illustrated in FIGS. 8A and 8B. In certain embodiments, the system may include a processor and other functional components adapted to calculate and store the peak interstory drift that occurs at each level of a building system, and to then display the peak values as damage indices on a graphical display. For example, the peak interstory drift for each floor level can be compared to interstory drift damage thresholds for yield, plastic hinge formation and ultimate strength or other predetermined limit states for a steel frame building, and displayed as a spotlight graphic for green (less than first yield), yellow (above yield but below plastic hinge formation) or red (beyond plastic hinge formation). With battery power back-up and appropriate attention to system reliability design in an earthquake environment such a system provides, for the first time ever, responsible building managers, emergency first responders, and other stakeholders a rapid and immediate indication of building shaking and potential damage levels and damage distribution right after a major earthquake. Such a capability will greatly assist rapid post-earthquake emergency response, emergency operations, re-occupancy and economic recovery.

Inter-Story Drift

Referring now to FIGS. 8A and 8B, another embodiment of the inventor's Inter-Story Drift Meter System (ISDMS) is illustrated. This embodiment of the ISDMS is designated generally by the reference numeral 800. The following is a list of the components of the ISDMS 800 shown in FIG. 8A and FIG. 8B:

Columns—802,
Structural (floor) beam—804,
Structural (floor) beam—806,
Direction arrow—808,
New shifted position—810,
Shift distance measurement—812,
Laser beam source—206,
Diffracted laser beam—208, and
PSDA 210.

FIG. 8A is a schematic showing the listed components in a static configuration, with the diffracted laser beam 208 intersecting the PSDA 210 at the neutral position 214 (As was also shown in FIG. 2).

FIG. 8B shows floor beam 806 moving in the direction of arrow 808 with respect to floor beam 804 during earthquake shaking. The movement of floor beam 806 will cause the diffracted laser beam 208 to shift on the PSDA 210 from the neutral position 214 to new shifted position 810. The distance the laser beam 208 has shifted will be measured by the PSDA and is labeled 812. This data will be used in the drift calculation.

Units Positioned at a Right Angle

Figure 9:
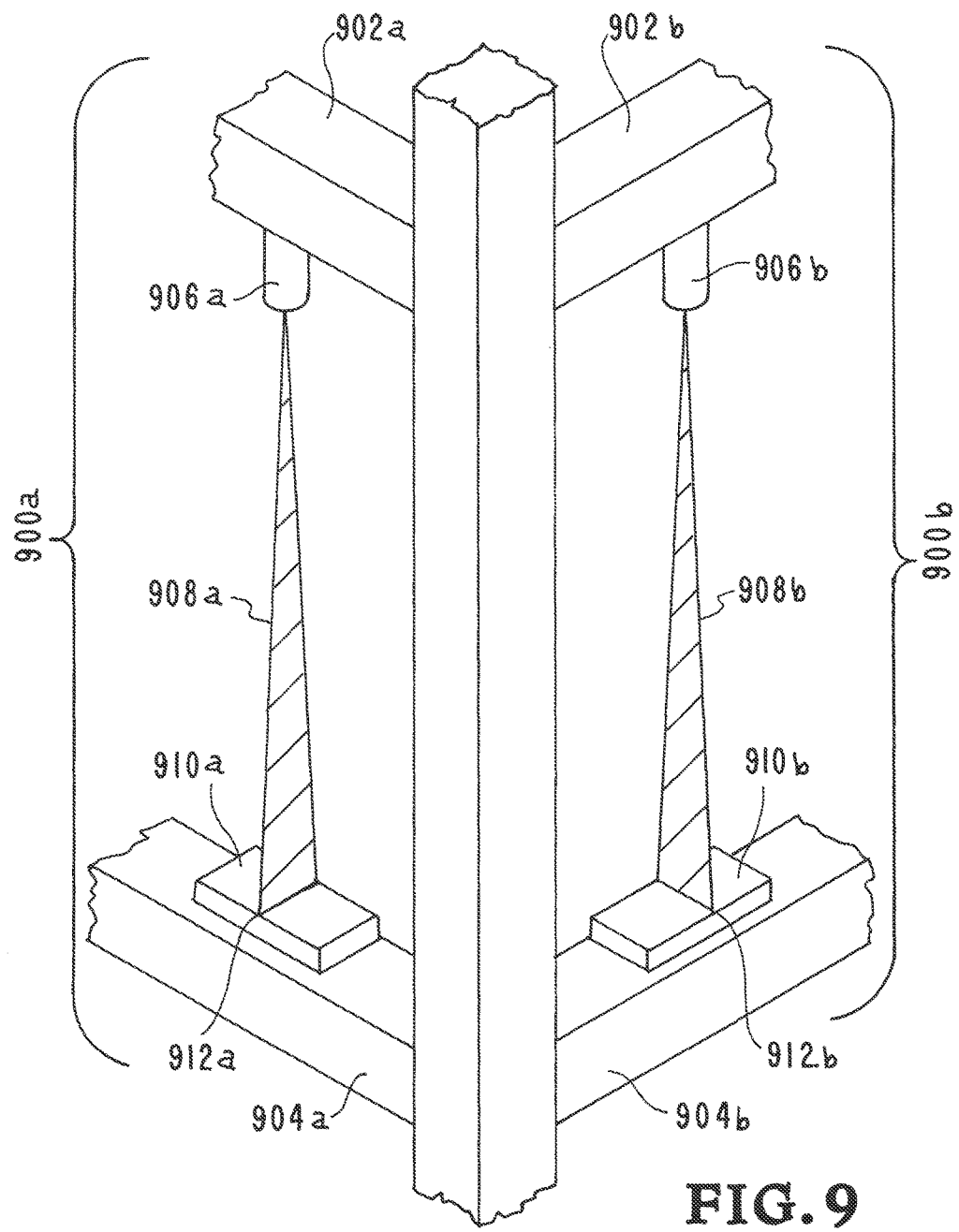
FIG. 9 illustrates an embodiment of a system of the present invention wherein laser and sensor arrays are positioned at right angles to measure the effects of multi-direction earthquake motions.

Referring now to FIG. 9, another embodiment of the inventor's Inter-Story Drift Meter System (ISDMS) is illustrated. The inventor's ISDMS shown in FIG. 9 utilizes a first unit 900A and a second unit 900B. The units 900A and 900b are positioned at a right angle to each other. The following is a list of the components of the units 900A and 900b shown in FIG. 9:

Upper structural (floor) beams—902a and 902b,
Lower structural (floor) beams—904a and 904b,
Laser beam sources—906a and 906b,
Diffracted laser beams—908a and 908b,
Position sensitive detector arrays (PSDA)—910a and 910b, and
Neutral positions on the PSDA—912a and 912b.

FIG. 9 show the units 900A and 900b positioned at right angles to each other. This allows the ISDMS to monitor, analyze and record movement of the building caused by an earthquake no matter which direction the shock waves of the earthquake hit the building. The laser beams 908a and 908b are directed onto the position sensitive detector arrays 910a and 910b for detecting the range of movement of the building caused by the earthquake.

The laser beams 908a and 908b are shown in the neutral positions 912a and 912b on the detector arrays 910a and 910b. The upper beams 902a and 902b have laser sources 906a and 906b mounted to the underside of the beams 902a and 902b. The lower beams 904a and 904b have position sensitive detector arrays (PSDA) 910a and 910b mounted on the top sides of the beams 904a and 904b. The laser sources 906a and 906b initially project diffracted laser beams 908a and 908b onto the mid portions 912a and 912b (the neutral position) of the PSDA. The PSDAs 910a and 910b are connected to a computer system (not shown) that analyzes, stores and displays the data produced by the PSDAs 910a and 910b.

Structural engineers are interested in interstory drift because it is closely related to structural performance and high levels of drift are indicative of unseen damage. It is a key building performance measure in existing engineering design codes. An accurate, convenient, and cost effective technique for measuring interstory drift could lead to an improved understanding of structural dynamics, and not only improve human safety, but greatly reduce the possibility or extent of damage due to wind and earthquake loads.

Figure 10:
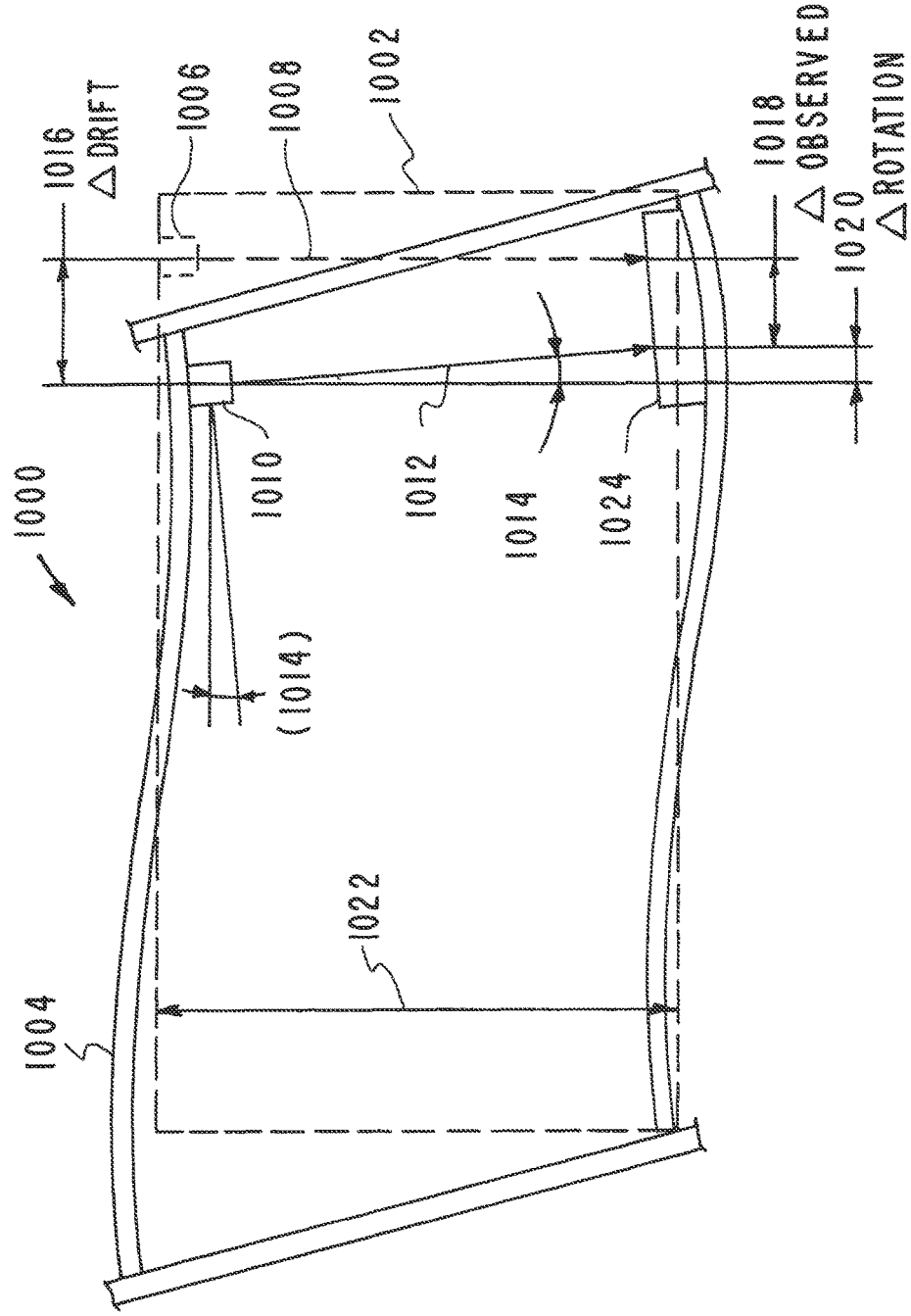
FIG. 10 illustrates deformation of a single bay of a multi-story structure during an earthquake including deformation and rotation of individual structural elements.

Referring now to FIG. 10, the deformation of a single bay of a multi-story structure is shown during an event. The following list identifies the components illustrated in drawing FIG. 10.

Single bay—1000
Initial position of structure—1002
Deformed position of structure during an earthquake—1004
Initial position of laser beam source—1006
Initial position of laser beam—1008
Position of laser source during an earthquake event—1010
Laser beam position during earthquake event—1012
Laser beam rotation angle—1014
Δ drift—1016
Δ observed—1018
Δ rotation—1020
H story height—1022
PSDA unit—1024

The following reference numerals are used to identify the initial position of the structure 1002, the initial position of the laser beam source 1006, the initial position of the laser beam 1008, the position of the laser source during an event 1010, and the laser beam position during event 1012. FIG. 10 shows the structure 1002 in the initial position (dashed lines) and in the event position (solid lines). The laser beam rotation angle is 1014. The Δ drift is 1016. The Δ observed is 1018. The Δ rotation is 1020. The story height "H" is 1022. The PSDA unit is 1024.

Earthquake Produces Local Rotations of Building Structures

When a building undergoes lateral motion during earthquake shaking, the overall interstory drift is accompanied by local rotations of the individual elements (horizontal beams and vertical columns) making up the structural frame of the building system. Lateral deformation (interstory drift) of a single bay 1000 of a building is shown to illustrate local rotation of the floor ($\Delta_{Floor}$ which can lead to a shift in laser beam location $\Delta_{Rotation}$) that must be corrected for in order to accurately calculate interstory drift. This has been noted historically as an issue that must be addressed for any optical sensor measurement system.

Correcting for Local Rotation of Laser

Figure 11A:
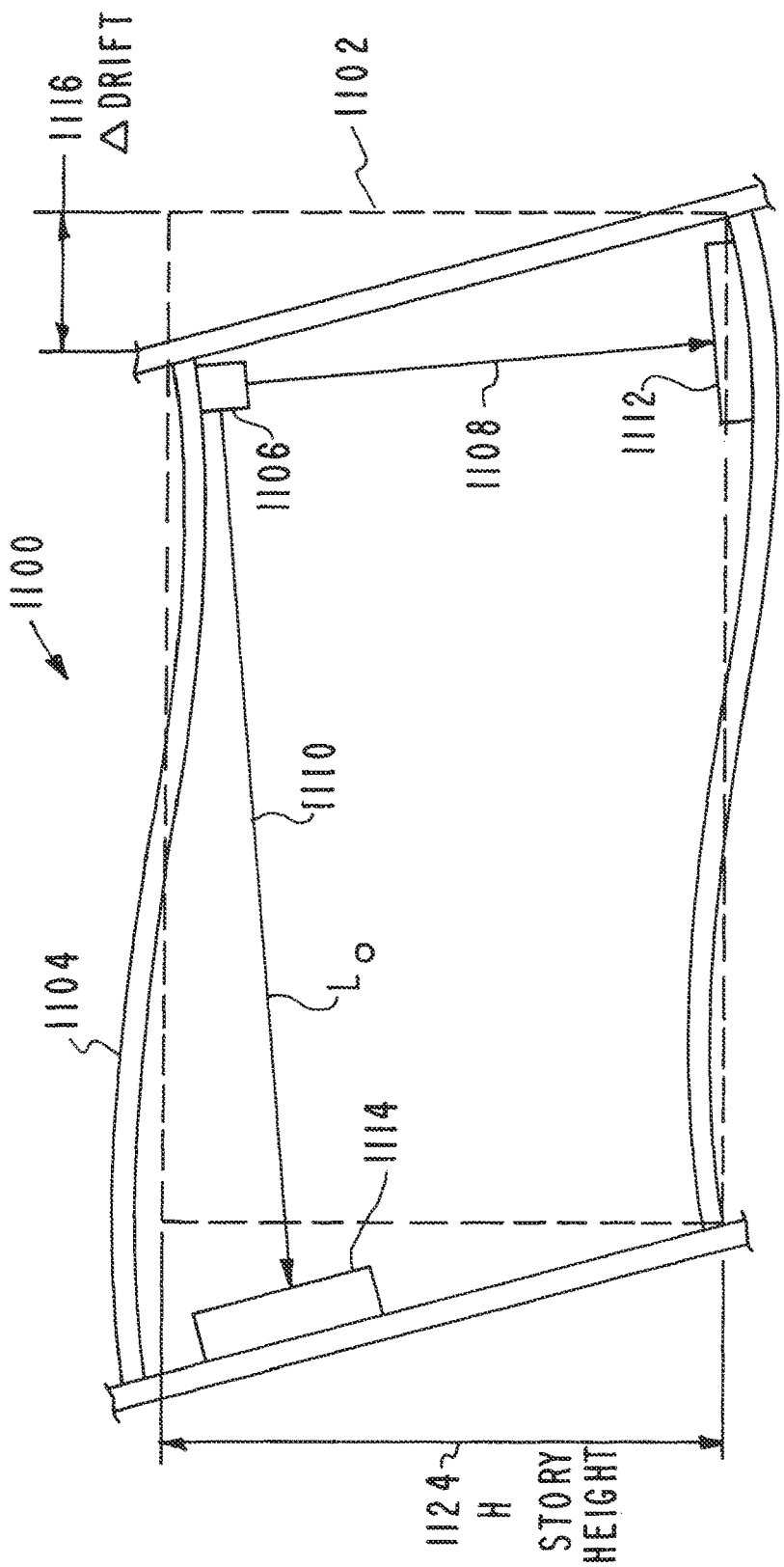
FIGS. 11A, 11B and 11C illustrate a system for correcting for local rotations in the measurement of interstory drift.
Figure 11B:
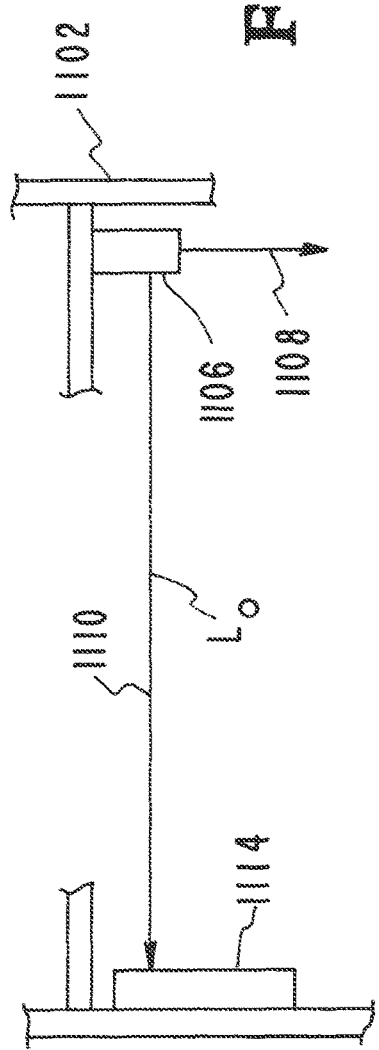

The inventors have developed a reliable and accurate method for correcting for the local rotation of the laser. This makes use of a second discrete diode PSD sensor mounted orthogonal (at right angles) to the PSD sensor mounted on the floor below. As illustrated in FIGS. 11A and 11B, this second sensor is used to determine the local floor rotation and make the appropriate correction to determine the actual interstory drift. In general, the degree of the correction that needs to be made will be a function of the relative bending stiffness between the vertical columns of the building and the horizontal floor beams. In typical buildings, because of the deformation pattern of a typical building frame, not correcting for this local rotation can result in an underestimation of the interstory drift as indicated in FIG. 10. From FIG. 10, to get to the actual drift $\Delta_{Drift}$, it is necessary to correct for the rotation induced motion $\Delta_{Rotation}$ by adding to the observed displacement on the PSD sensor $\Delta_{Observed}$.

Figure 11C:
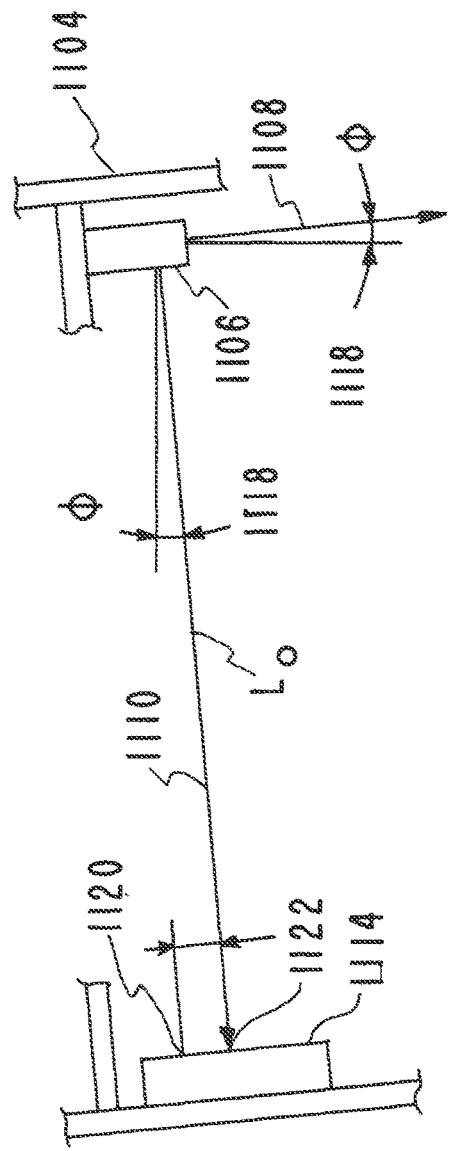

FIGS. 11A, 11B and 11C illustrate an embodiment of the inventors' system for correcting for local rotation. A list of the components of FIGS. 11A, 11B and 11C is provided below.

Single bay—1100
Initial position—1102
Event position—1104
Laser beam source—1106
$1^{st}$ laser beam—1108
$2^{nd}$ laser beam—1110
$1^{st}$ PSDA unit—1112
$2^{nd}$ PSDA unit—1114
Δ Drift—1116
Rotation angle—1118
$1^{st}$ data point—1120
$2^{nd}$ data point—1122

The system of FIGS. 11A, 11B and 11C provide for obtaining an accurate determination of the laser rotation. FIG. 11A shows the structure 1102 in the initial position (dashed lines) and in the event position (solid lines). Also shown are a laser source 1106 and two laser beams 1108 and 1110 at right angles to each other. Two PSDA units 1112 and 1114 as well as 1124 H the story height and 1116 Δ drift. FIG. 11B is a simplified view of some of the items of FIG. 11A when the structure 1102 is in the initial position and FIG. 11C shows the same items during an event. The measurement is indicated on the $2^{nd}$ PSDA unit 1114 by the data points 1120 and 1122.

The second PSD sensor makes use of the fact that the effect of the small local rotation at the point of laser mount is effectively amplified when projected through the horizontal distance "$L_0$" which creates an amplified signal of the location rotation on the second PSD sensor. This can be accomplished by splitting the laser beam into two orthogonal line sources. The ability to appropriately correct for local rotation has been experimentally demonstrated in the laboratory. The experimental data demonstrates the validity and accuracy of the inventors approach.

Figure 12:
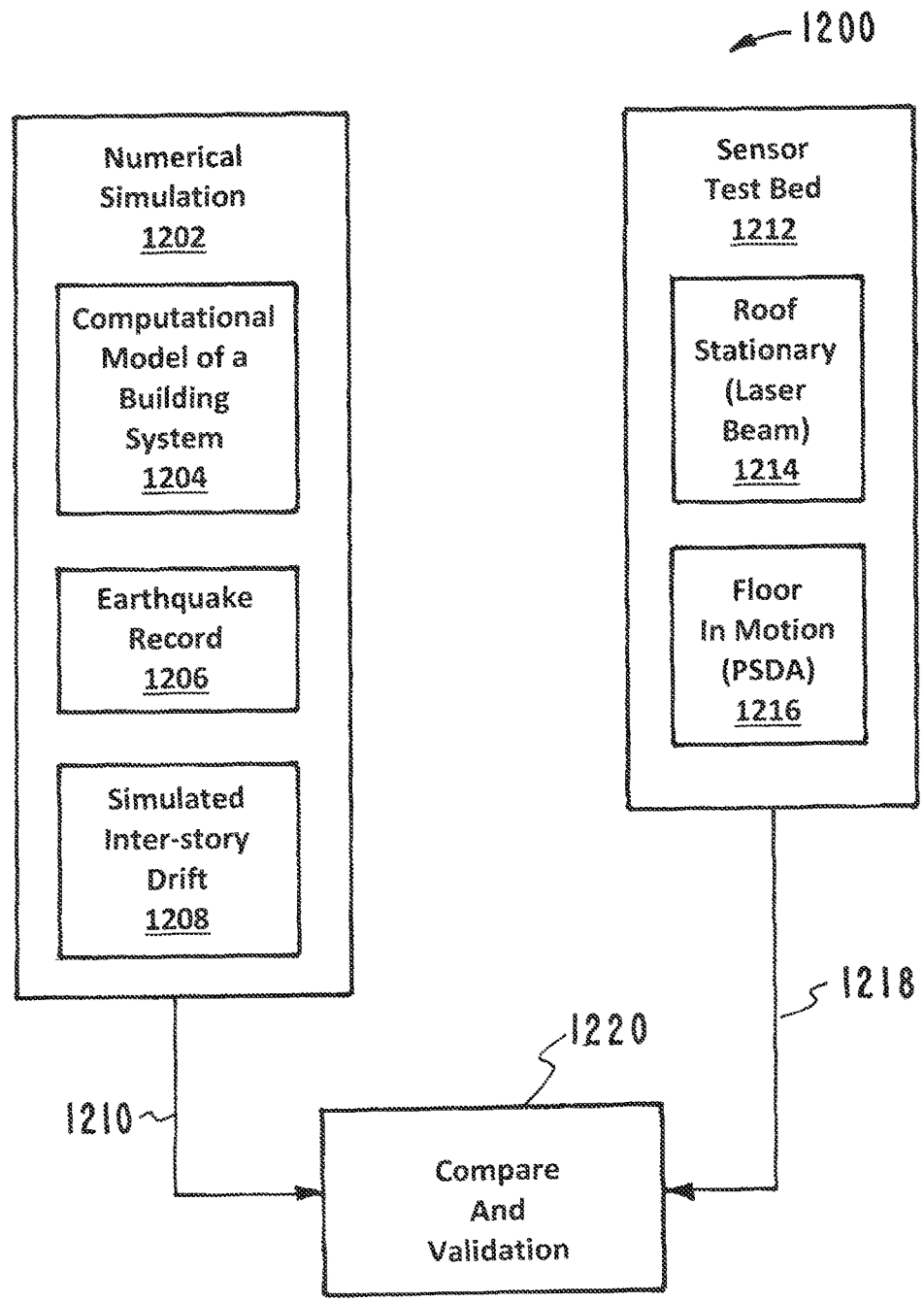
FIG. 12 is a flow chart illustrating a method of validating the PSDA sensor performance.

Referring now to FIG. 12, a flow chart illustrates an embodiment of the inventors' method of validating the PSDA sensor performance. The steps of the method are listed below.

Illustration of method—1200
Numerical simulation module—1202
Computational model of a building system—1204
Earthquake record—1206
Simulated inter-story drift—1208
Data generated by numerical simulation module—1210
Sensor test bed numerical simulation module—1212
"Roof" stationary (laser beam)—1214
"Floor" motion PSDA—1216
Data from numerical simulation module—1218
Compare and validation module—1220

In FIG. 12 the numerical simulation module 1202 will use the information in 1204 the computational model of a building system along with the earthquake record 1206 and simulated inter-story drift 1206 information to produce the data 1210. The sensor test bed module 1212 will use the information acquired from the test bed items 1214 and 1216 to produce the data 1218. The data 1210 and 1218 are then entered in the compare and validation module for validation of the sensor performance.

Single Laser Beam Optically-Based Inter-Story Drift Meter

Figure 13A:
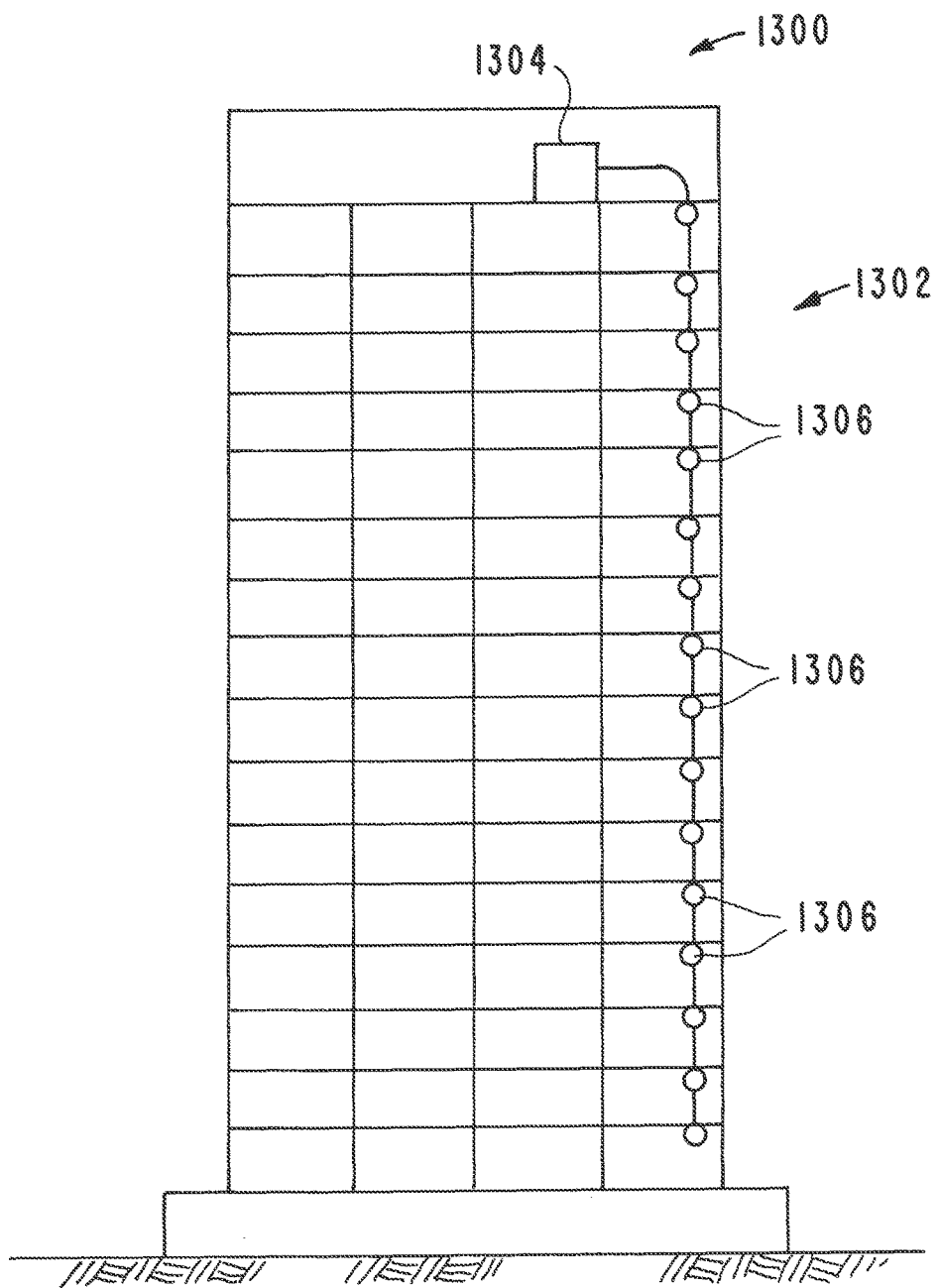
FIGS. 13A, 13B, and 13C show embodiments of single laser beam Optically-based Inter-story Drift Meter systems.
Figure 13B:
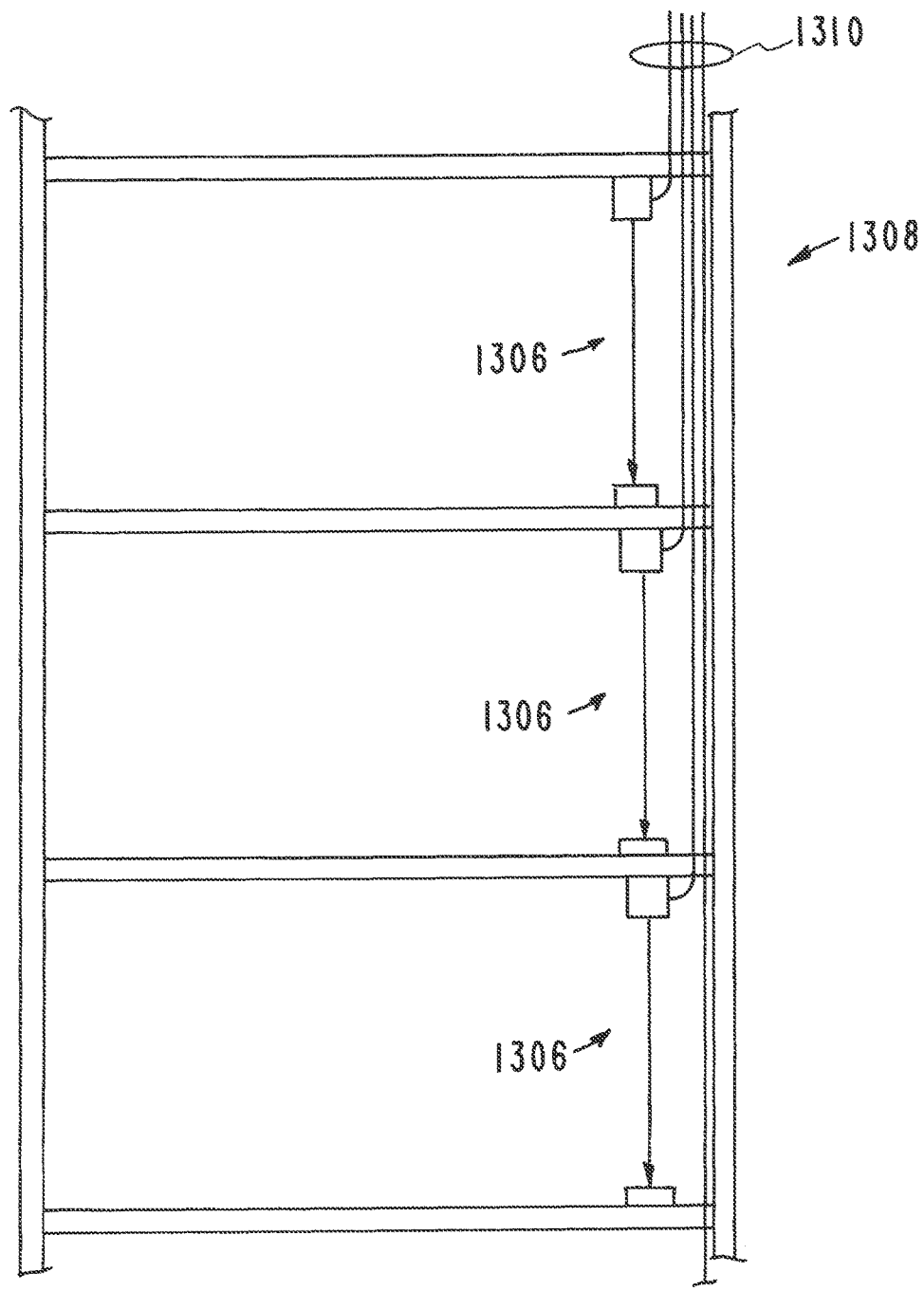
Figure 13C:
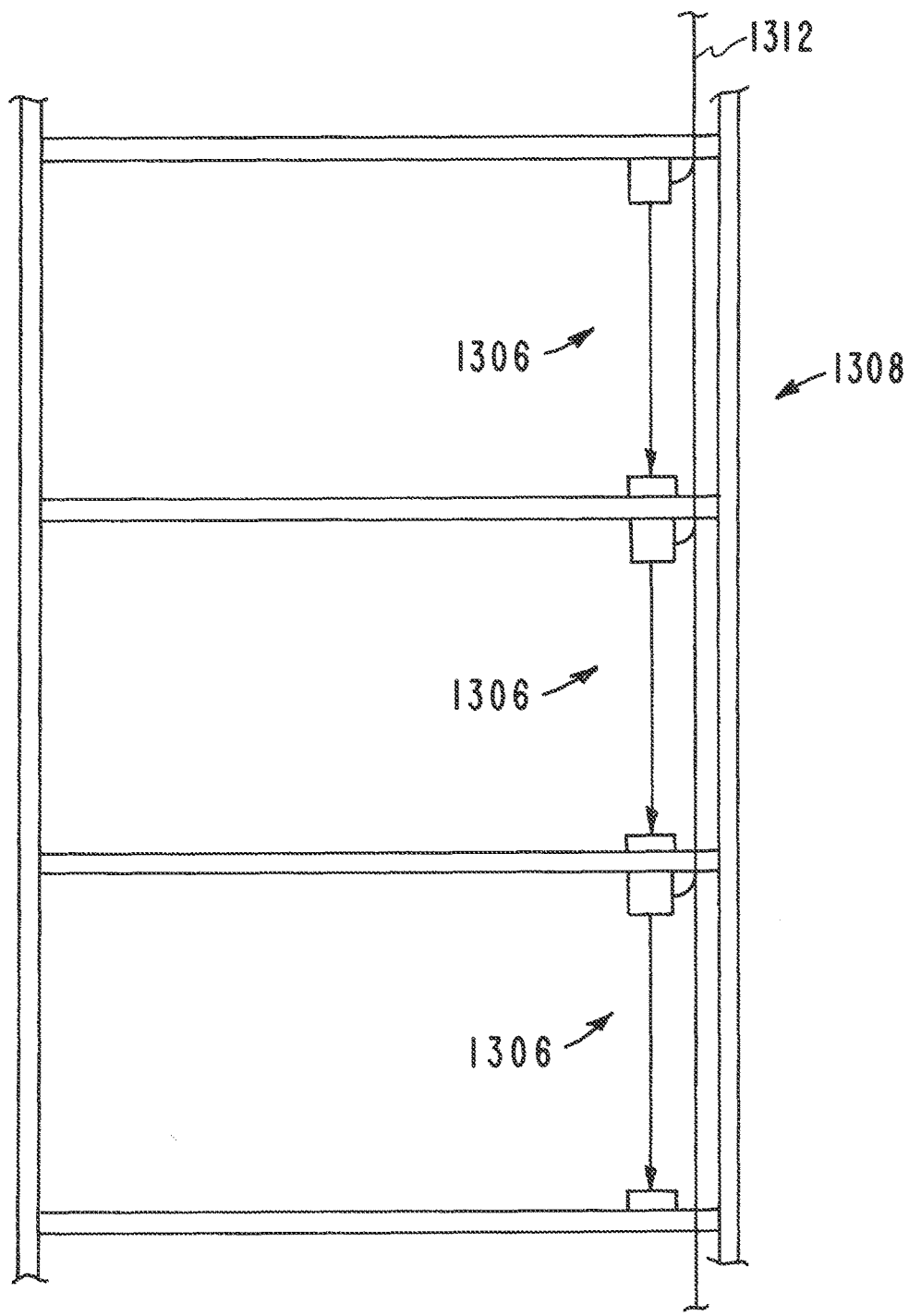

Referring now to FIGS. 13A, 13B, and 13C, embodiments of the inventors' single laser Optically-based Inter-story Drift Meter system are shown. FIG. 13A shows a multi-story structure with a single high powered laser 1304 as a laser beam source for each of the Optically-based Inter-story Drift Meter Systems. The individual Optically-based Inter-story Drift Meter Systems 1306 are represented as small circles.

In FIG. 13B a bundle of fiber optic cables 1310 are connected to a single powerful laser beam source (not shown) with an individual fiber optic dedicated to each Optically-based Inter-story Drift Meter System 1306 located on each floor of a multi-story structure 1308. FIG. 13C illustrates another method of supplying the laser beam to drift meter systems 1306. Here a single fiber-optic cable connected to a powerful laser source (not shown) supplies the laser beam to each of the drift meter systems by the use of optical switches. Each floor of the multi-story structure 1308 will have drift meter system 1306.

Computer System

Figure 14:
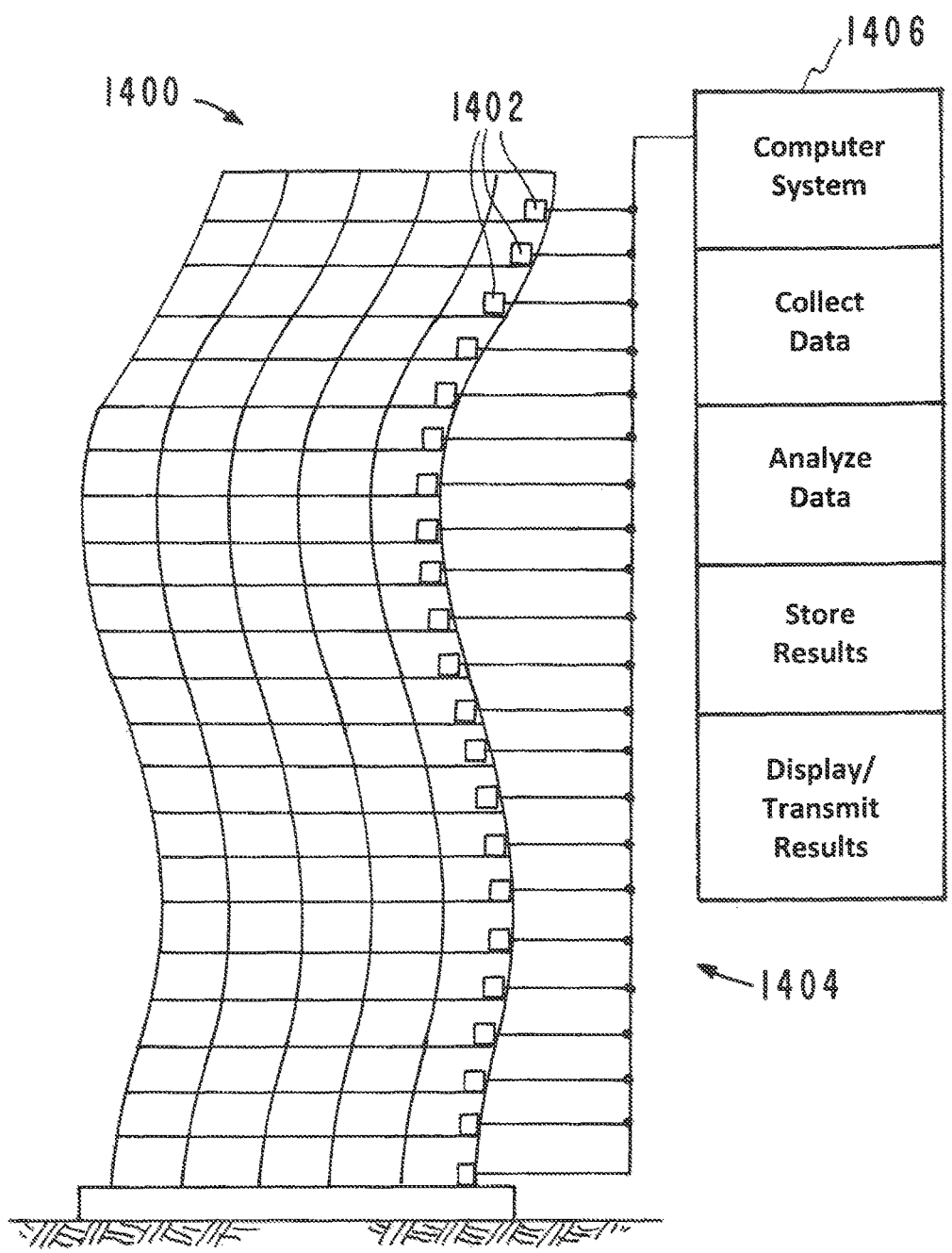
FIG. 14 illustrates a computer system that collects data from the drift meter system on each floor, analyzes the data, and stores the results.

A computer system collects data from the drift meter system on each floor, analyzes the data, and stores the results. FIG. 14 illustrates a multi-story structure 1400 with each floor of the structure equipped with a drift meter system 1402, here represented by small squares. The drift meter systems a connected to a computer 1406 by a cable system 1404. The cable system 1404 can be individual cables from each drift meter system 1402 or a multiplex system using a single cable. Alternately a WI-FI system using technology such a Bluetooth can be used to connect the drift meters to the computer 1406. The computer system 1406 collects data from the drift meters and analyzes the data and stores the results. The results can viewed at some predetermined location or can be transmitted to a remote location.

With respect to overall system design, the inventors have developed a couple of options for system deployment which include:

Option (1) A discrete laser and corresponding PSDs at each floor location where a measurement is desired.

Option (2) A single high power laser located in the building with fiber optic cables piping the laser light to each location where a sensor measurement will be made (this concept could be particularly useful when deployed in a new building where including optical cables could be designed into construction).

With either method of deployment, one of the great advantages of the inventors' system is the ability to display response information immediately after an earthquake with a minimal amount of processing and analyses.

Digital Bar for Read-Out of Peak Interstory Drifts at Each Floor Level

The inventors have developed a visual display concept that can immediately show the drift amplitude at each story level and compare this to predetermined allowable values for the building. The sensor utilizes a digital optical bar that shows the peak interstory drift at a location in both directions of in-plane motion at a given floor level. The digital bar indicates the peak drift and color codes the drift to indicate where in the spectrum of response the drift corresponds to. The digital bar concept and the manner in which it captures peak drift is illustrated in FIGS. 15A, 15B, 15C, and 15D. Such a read-out can be located in a panel on the building being monitored, and could also be transmitted rapidly over the web and displayed in a mobile phone application so cognizant building owners and operations managers would immediately get real time data on building response including potential damage indicators. A prototype of the Digital Bar has been developed and tested.

FIGS. 15A, 15B, 15C, and 15D illustrate a system for displaying the data for an individual floor level from a drift meter installation of a multi-story structure. The inventors have developed a way to display the interstory drift measurement. It consists of a dynamic bar system whereby the drift shows physically on a color coded bar read-out. In each direction the laser motion 'pushes" a bar denoting the peak interstory drift in that direction (it is an electrical analog of a mechanical system that capture peak values). As the peak drift bars get pushed out to higher values, they change color to orange and then red in accordance with predetermined drift thresholds for the particular building being measured.

Figure 15A:
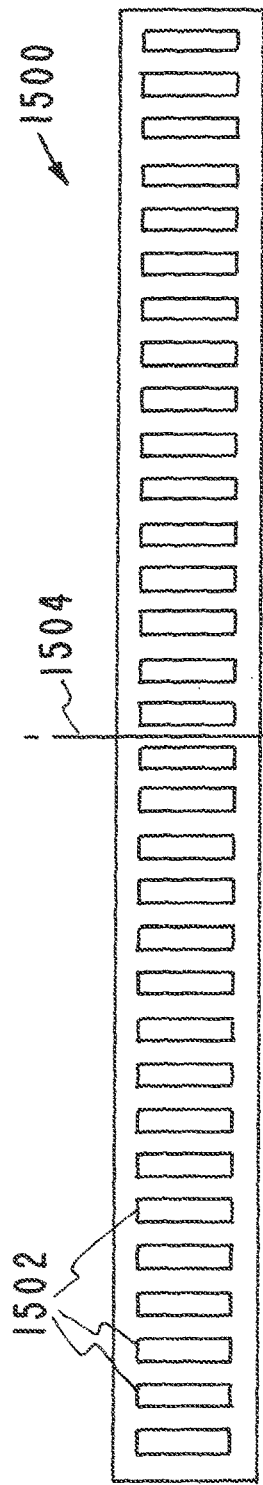
Figure 15B:
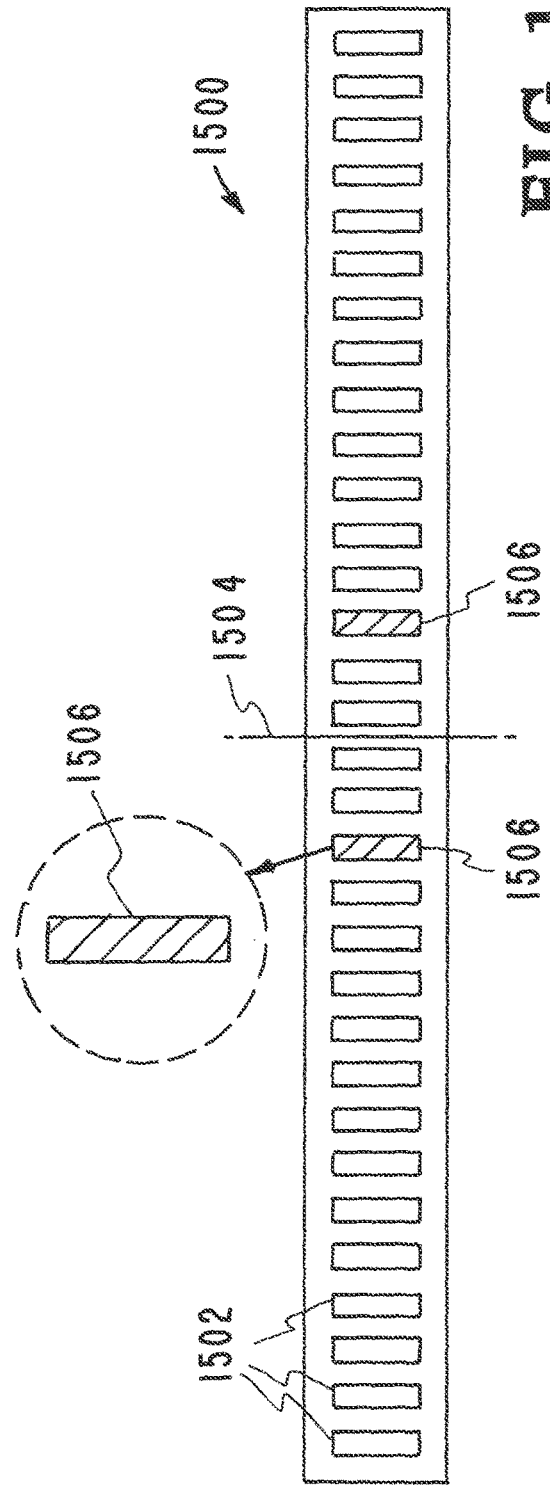

In FIG. 15A is shown a LED bar graph display 1500 with a mid-point location 1504 and individual bars 1502. In FIG. 15B the display 1500 is shown after a small earthquake event. Two of the bars 1502 located at some distance from the mid-point 1504 will be displaying the color green 1506 indicating mild damage. In FIG. 15C after a medium size earthquake event the display 1500 shows two of the bars 1502 at a further distance from the mid-point 1404 and these bars 1508 will be colored yellow or orange to indicate moderate damage to the structure perhaps requiring more inspection before cleared for use. In FIG. 15D after a large earthquake event the bars 1510 are even farther from the mid-point 1504 and will be colored red indicating a more extensive level of damage to the structure at the corresponding floor level.

The described concept for interstory drift measurement provides the technical basis for a building interstory drift meter system that will quickly and effectively determine, and display, the response of a building immediately after an earthquake. The implementation of a set of sensors throughout the building provides building owners with an immediate read-out of the maximum interstory drifts and whether the building has undergone drifts that are associated with damage levels in the building. By comparison with pre-established damage thresholds for interstory drift for the building in question, this is displayed as a story-by-story "stoplight" graphic that is indicative of damage levels.

Inventors Simulations and Experiments

The sensor design concept has been thoroughly evaluated based on numerical simulations to determine realistic earthquake-induced building interstory drifts, combined with a unique experimental test-bed that was specifically designed and constructed to test the sensor concept. The computer simulations of the earthquake response of representative multi-story buildings utilized fiber-based, elasto-plastic beam element models of steel frame buildings ranging from three stories to forty stories in height. Building earthquake excitations were generated from a suite of historical earthquake ground motion records and a database of interstory drift time histories was created. A number of the earthquake records generated inelastic behavior in the buildings, with corresponding permanent deformation of the building frames where the inelastic models indicate permanent building displacements at the end of the earthquake excitation.

In order to test the new sensor design for these representative simulation-generated (synthetic) interstory drifts, an appropriately designed and fabricated experimental test-bed consisting of a precision electromechanical motion table that allows interstory records from building simulations to be reproduced in the laboratory. This precision table included capabilities for motions in two orthogonal directions (to allow experiments in bi-axial earthquake motions) and consisted of driving stepper motors moving a metal platform mounted on precision linear bearings based on high resolution position feedback. The metal platform provided a sensor mount on which to place and drive a position sensitive detector prototype device.

The motors and motor amplifiers of the motion table are controlled with a digital motion controller that controls the position, speed and acceleration of each motor in order to move the platform very accurately to achieve a specified control motion. The control system Proportional/Integral/Derivative (PID) gains were tuned for optimal performance within the range of motion, dynamic frequency content and payload masses required to replicate interstory drift motions a range of representative building structures. This required accurate representation of interstory drifts for buildings of three (stiff) to forty story (flexible) stories.

The ability of the motion table to precisely replicate a range of interstory drifts was carefully validated by comparing the measured table generated motions with the input target motions. The motion table has the ability to fully replicate interstory drifts, including permanent final displacements due to inelastic building action, for representative three and forty story buildings. The motion table and the associated automatic control loop has proven capable of replicating interstory drift measurements, including permanent drift due to inelastic action, with great accuracy and precision.

Evaluation of Sensor Performance

The overall procedure utilized to evaluate the performance of the diode-based PSD sensor was consisted of three steps: (1) execute a computer simulation of a representative building structure subjected to historical measured earthquake ground motion record, saving the synthetic (computed) interstory drift time histories in a digital file; (2) based on the simulated interstory drifts, drive the electromechanical motion table to replicate these interstory drifts between the "floor" (location of table platform) and the "roof" (location of laser mount); and (3) utilize the PSD sensor to measure the interstory drift time history and compare to the table generated motions to evaluate sensor performance.

Using this process a diode based prototype sensor has been experimentally evaluated for a range of interstory drift motions. For example, a comparison between the motion table generated control motions and the corresponding displacement measurement with the diode sensor for three and 40 story buildings. The diode sensor provided excellent tracking of the imposed interstory drift for both the three and forty story buildings, and accurately captures the permanent drift due to inelastic building action at the end of the motion time history.

The diode sensor exhibits excellent performance and provides a strong technological basis for a system design for an optically based interstory drift measurement system.

Finally, a scale-model two story building frame has been constructed and testing in the laboratory under simulated earthquake motion input to demonstrate the accuracy of such a PSDA based system to measure interstory drift and appropriately correct for laser rotation.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An apparatus for measuring interstory drift of a building wherein the building has a reference floor and an adjacent floor immediately adjacent the reference floor, comprising:
   a laser beam source operatively connected to the reference floor,
   a laser beam produced by said laser beam source, said laser beam being a diffracted laser beam having a fan shape directed toward the adjacent floor,
   a sensor array operatively connected to the adjacent floor, said sensor array including:
      a plurality of parallel rows of sensors, with adjacent rows having sensors offset laterally from one another such that no two immediately adjacent said rows are laterally aligned, and wherein the fan shaped laser beam has a width sufficient to simultaneously span across all the rows of the sensor array; and
   the sensor array being positioned to receive said laser beam for measuring interstory drift of the building.

2. The apparatus for measuring interstory drift of a building of claim 1 wherein said laser beam produced by said laser beam source generates a diffracted laser beam which imparts the fan shape to the laser beam.

3. The apparatus for measuring interstory drift of a building of claim 1 wherein said sensor array is a diode sensor array.

4. The apparatus for measuring interstory drift of a building of claim 1 wherein said sensor array is a diode sensor array including at least three parallel, closely adjacently spaced rows of diode sensors, with the diode sensors of immediately adjacent rows being laterally offset from one another such that every row of said sensors is staggered from an adjacent row, or rows, of said sensors.

5. The apparatus for measuring interstory drift of a building of claim 1 wherein said laser beam source is a discrete laser unit located at each floor level.

6. The apparatus for measuring interstory drift of a building of claim 1 wherein said laser beam source is an optical fiber connected to a centralized laser unit.

7. The apparatus for measuring interstory drift of a building of claim 1 further comprising a second laser beam oriented at an angle to said laser beam for detecting rotation of said laser beam source.

8. The apparatus for measuring interstory drift of a building of claim 7 wherein said second laser beam is positioned at a right angle to said laser beam.

9. The apparatus for measuring interstory drift of a building of claim 1 further comprising,
   a second laser beam source operatively connected to the reference floor,
   a second laser beam produced by said second laser beam source, said second laser beam directed to the adjacent floor, and
   a second sensor array operatively connected to the adjacent floor, said second sensor array positioned to receive said second laser beam for measuring interstory drift of the building,
   wherein said second laser beam source, said second laser beam, and said second sensor array are positioned at an angle to said laser beam source, said laser beam, and said sensor array.

10. The apparatus for measuring interstory drift of a building of claim 9 wherein said angle is a right angle.

11. The apparatus for measuring interstory drift of a building of claim 1 wherein said sensor array produces an interstory drift signal, further comprising a field programmable gate array for data collection and a computer system for analyzing and storing said interstory drift signal.

12. The apparatus for measuring interstory drift of a building of claim 1 wherein said sensor array includes a digital optical bar that visually shows the interstory drift.

13. The apparatus for measuring interstory drift of a building of claim 12 wherein said digital optical bar that shows different colors representing different color codes to indicate the interstory drift, with the color codes defined by predetermined building drift indices for various damage levels.

14. The apparatus for measuring interstory drift of a building of claim 1 wherein the building is a multistory building, the reference floor is an upper floor, and the adjacent floor is a lower floor immediately below the reference floor,
wherein said laser beam source is connected to said upper floor; and
wherein said sensor array is connected to said lower floor.

15. The apparatus for measuring interstory drift of a building of claim 1 wherein the building is a multistory building, the reference floor is a lower floor, and the adjacent floor is an upper floor immediately above the reference floor,
wherein said laser beam source is connected to said lower floor; and
wherein said sensor array is connected to said upper floor.

16. A system for monitoring interstory drift of buildings wherein each of the buildings have a reference floor and an adjacent floor immediately adjacent to the reference floor, comprising:
a laser beam source operatively connected to the reference floor of each the buildings,
a diffracted laser beam produced by each said laser beam source, each said laser beam having a fan shape and directed to each of the adjacent floor of the buildings,
a sensor array operatively connected to each of the adjacent floor of the buildings, each said sensor array having a plurality of parallel rows of sensors, with adjacent ones of said rows staggered from one another such that no two immediately adjacent rows of the sensors are laterally aligned, and positioned to receive said laser beam for measuring interstory drift of the buildings and producing measurement signals, and the fan shape of each said laser beam having a width sufficient to simultaneously span across all the rows of its associated said sensor array; and
a system operatively connected to said sensor array that receives said measurement signals and monitors interstory drift of the buildings.

17. The system for monitoring interstory drift of buildings of claim 16 wherein each said sensor array produces an interstory drift signals, further comprising a computer system for analyzing and storing said interstory drift signals.

18. A method of monitoring interstory drift of a building wherein the building has a reference floor and an adjacent floor immediately adjacent to the reference floor, comprising the steps of:
operatively connecting a laser beam source to the reference floor of the building,
using said laser beam source to produce a laser beam that is directed to the reference floor of the building, the laser beam having a fan shape,
operatively connecting a sensor array to the adjacent floor of the building, the sensor array including a plurality of rows of sensors where adjacent ones of said rows are staggered such that no two adjacent ones of the rows are laterally aligned, and the fan shape of the laser beam having a width sufficient to simultaneously span all the rows of the sensors of the sensor array,
positioning said sensor array to receive said laser beam for measuring interstory drift of the building wherein said sensor array produces a measurement signal; and
operatively connecting a monitoring system to said sensor array for receiving said measurement signal and monitoring interstory drift of the building.

\* \* \* \* \*